United States Patent
Carmi

(10) Patent No.: US 12,548,221 B2
(45) Date of Patent: Feb. 10, 2026

(54) SYSTEMS AND METHODS FOR AUTOMATIC QUALITY CONTROL OF IMAGE RECONSTRUCTION

(71) Applicant: GE Precision Healthcare LLC, Wauwatosa, WI (US)

(72) Inventor: Raz Carmi, Haifa District (IL)

(73) Assignee: GE PRECISION HEALTHCARE LLC, Wauwatosa, WI (US)

(*) Notice: Subject to any disclaimer, the term of this patent is extended or adjusted under 35 U.S.C. 154(b) by 400 days.

(21) Appl. No.: 18/191,812

(22) Filed: Mar. 28, 2023

(65) Prior Publication Data
US 2024/0331223 A1    Oct. 3, 2024

(51) Int. Cl.
*G06K 9/00* (2022.01)
*G06T 7/00* (2017.01)
(Continued)

(52) U.S. Cl.
CPC .......... *G06T 11/005* (2013.01); *G06T 7/0014* (2013.01); *G06T 7/74* (2017.01);
(Continued)

(58) Field of Classification Search
CPC ....... G06T 11/005; G06T 7/0014; G06T 7/74; G06T 2207/10081; G06T 2207/10088;
(Continued)

(56) References Cited

U.S. PATENT DOCUMENTS

2019/0244398 A1* 8/2019 Carmi ................ G06T 7/0016
2019/0325619 A1* 10/2019 Zhang ................ G06T 11/008
(Continued)

FOREIGN PATENT DOCUMENTS

WO    2013088294 A1    6/2013

OTHER PUBLICATIONS

D. Hu et al., "SEA-Net: Structure-Enhanced Attention Network for Limited-Angle CBCT Reconstruction of Clinical Projection Data," in IEEE Transactions on Instrumentation and Measurement, vol. 72, pp. 1-13, 2023, Art No. 4507613, doi: 10.1109/TIM.2023.3318712 (Year: 2023).*

(Continued)

*Primary Examiner* — Atiba O Fitzpatrick
(74) *Attorney, Agent, or Firm* — McCoy Russell LLP

(57) ABSTRACT

Various methods and systems are provided for automatic quality control of image reconstruction. In one example, a method comprises obtaining medical image data, reconstructing the medical image data with a baseline reconstruction algorithm to generate one or more baseline reconstruction images and an enhanced reconstruction algorithm to generate one or more enhanced reconstruction images, detecting and localizing a set of features of interest within the one or more baseline reconstruction images, determining image values for each of the features of interest, comparing image values of the one or more baseline reconstruction images to corresponding image values of the one or more enhanced reconstruction images to determine one or more statistical characteristics, comparing the one or more statistical characteristics to predetermined criteria to determine deviations, and automatically modifying one or more parameters of the enhanced reconstruction algorithm based on the deviations.

12 Claims, 13 Drawing Sheets

(51) Int. Cl.
 *G06T 7/73* (2017.01)
 *G06T 11/00* (2006.01)
(52) U.S. Cl.
 CPC ............... *G06T 2207/10081* (2013.01); *G06T 2207/10088* (2013.01); *G06T 2207/10104* (2013.01); *G06T 2207/10108* (2013.01); *G06T 2207/10132* (2013.01); *G06T 2207/20081* (2013.01); *G06T 2207/30096* (2013.01); *G06T 2210/41* (2013.01); *G06T 2211/441* (2023.08)
(58) Field of Classification Search
 CPC . G06T 2207/10104; G06T 2207/10108; G06T 2207/10132; G06T 2207/20081; G06T 2207/30096; G06T 2210/41; G06T 2211/441; G06T 2211/424; G06T 11/003; G06T 5/40; G06T 5/50; G06T 2207/20104; G16H 30/40
 See application file for complete search history.

(56) References Cited

U.S. PATENT DOCUMENTS

| | | | |
|---|---|---|---|
| 2020/0066009 A1* | 2/2020 | Dwivedi | G06T 11/006 |
| 2021/0133976 A1* | 5/2021 | Carmi | A61B 5/7267 |
| 2021/0150782 A1* | 5/2021 | Khalighi | G06T 11/006 |
| 2022/0058804 A1* | 2/2022 | Carmi | G06N 3/0895 |
| 2025/0069290 A1* | 2/2025 | Rajagopal | G16H 50/20 |

OTHER PUBLICATIONS

S. Seyyedi, E. Liapi, T. Lasser, R. Ivkov, R. Hatwar and J. W. Stayman, "Low-Dose CT Perfusion of the Liver Using Reconstruction of Difference," in IEEE Transactions on Radiation and Plasma Medical Sciences, vol. 2, No. 3, pp. 205-214, May 2018, doi: 10.1109/TRPMS.2018.2812360 (Year: 2018).*

EP application 24163173.8 filed Mar. 13, 2024—extended Search Report issued Sep. 16, 2024, 9 pages.

* cited by examiner

SYSTEMS AND METHODS FOR AUTOMATIC QUALITY CONTROL OF IMAGE RECONSTRUCTION

FIELD

Embodiments of the subject matter disclosed herein relate to quality control of image reconstruction, and more particularly to quality control of enhanced reconstruction algorithms.

BACKGROUND

Non-invasive image technologies allow images of internal structures or features of a patient/object to be obtained without performing an invasive procedure on a patient or subject. In particular, such non-invasive imaging technologies rely on various physical principles, such as the differential transmission of x-rays through a target volume, the reflection of acoustic waves within the volume, the paramagnetic properties of different tissues and materials within the volume, the breakdown of targeted radionuclides within the body, and so forth, to acquire data and to construct images or otherwise represent the observed internal features of the patient or subject.

All reconstruction algorithms, including analytical and iterative reconstruction methods are subject to various technical tradeoffs, such as between computational efficiency, patient dose, scanning speed, image quality, and artifacts. For example, enhanced iterative reconstruction techniques, while generating images of higher quality, may produce false-positive results when compared to baseline (e.g., conventional) iterative reconstruction methods.

BRIEF DESCRIPTION

In one example, a method is provided herein, the method comprising: determining first image values of a first set of features of interest within one or more baseline reconstruction images reconstructed by a baseline reconstruction algorithm; determining second image values of a second set of features of interest within one or more enhanced reconstruction images reconstructed by an enhanced reconstruction algorithm, wherein the second set of features of interest are co-localized with the first set of features of interest relative to an image volume; comparing the first image values to the second image values to determine one or more statistical characteristics of the one or more enhanced reconstruction images; automatically modifying one or more parameters of the enhanced reconstruction algorithm based on the one or more statistical characteristics, wherein the enhanced reconstruction algorithm was used to generate the one or more enhanced reconstruction images; and storing the enhanced reconstruction algorithm with the modified one or more parameters in memory.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
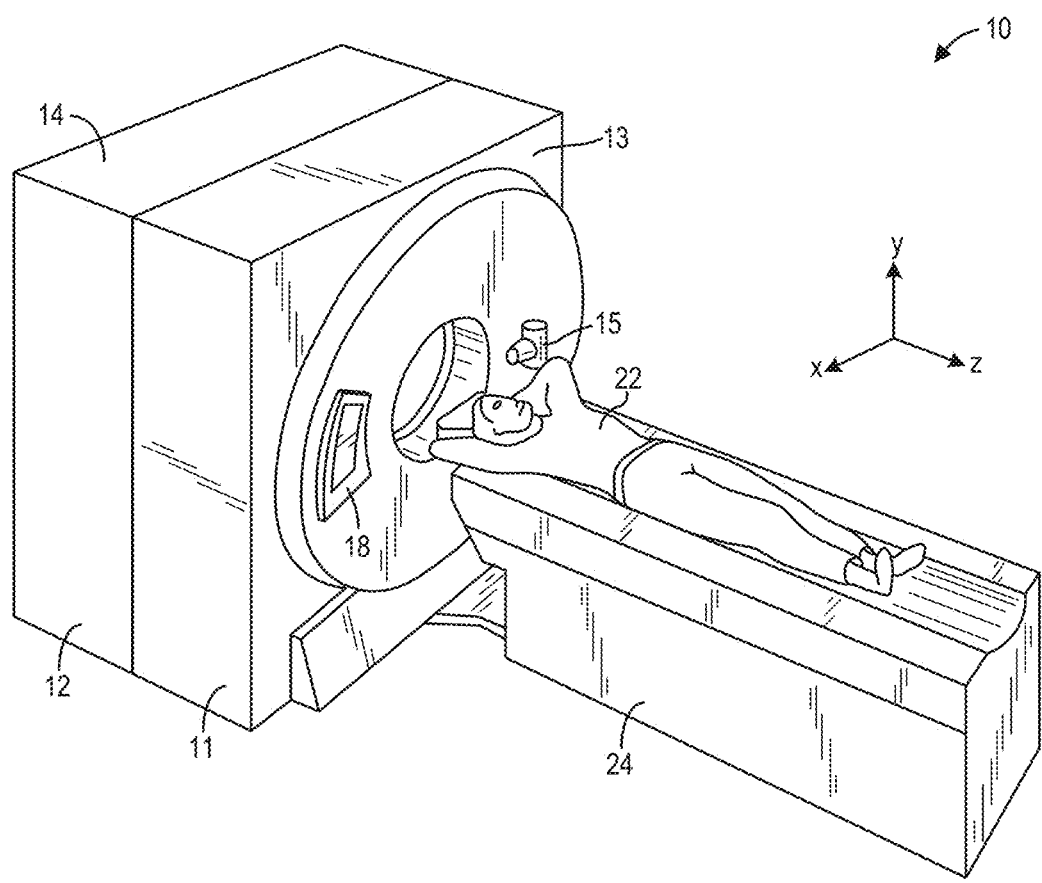
FIG. 1 is a pictorial view of an imaging system according to an embodiment of the invention.

This description and embodiments of the subject matter disclosed herein relate to methods and systems for automatic quality control of image reconstruction techniques. Images acquired with imaging systems, such as Positron Emission Tomography (PET) systems, are reconstructed via application of a reconstruction algorithm. Reconstruction is a process whereby an image is formed from raw data collected by the multi-modality imaging system. Reconstruction for clinical images may be accomplished by various methods and/or techniques, including analytical techniques, such as filtered back projection, and iterative techniques. Iterative reconstruction techniques may include conventional (e.g., baseline) techniques and enhanced techniques. Conventional techniques may include maximum likelihood expectation maximization (MLEM)-based techniques such as ordered subset expectation maximization (OSEM). Enhanced techniques may include a block sequential regularized expectation maximization (BSREM) algorithm and deep-learning techniques.

Baseline reconstruction algorithms may be predictable and produce stable image quality but may output relatively high noise and less enhanced small lesions or uptake regions. Enhanced reconstruction techniques, in contrast, may generate images with lower noise and higher enhanced small lesions compared to baseline reconstruction algorithms. However, higher enhancement of small lesions may lead to enhancement of image artifacts and/or false smoothing of small low-contrast lesions or uptakes. In wide clinical use, such enhanced reconstruction algorithms may be sensitive to variations in scanning protocols and workflow. For example, variable scanning protocols may include scan time, administered dose of contrast and/or radioactive tracer agents such as iodine, gadolinium, radioactive fluoride, and/or radioactive gallium, system type, and variable types of radioactive tracers (e.g., fluorodeoxyglucose (FDG), F18-PSMA, Ga68-DOTATATE, etc.). Such variations may not be predictable over time and may result in enhanced reconstruction algorithms generating inaccurate images.

In some examples, enhanced reconstruction algorithms may be deep learning or machine learning methods. Such deep learning and/or machine learning methods may be trained based on specific data sets that may not predict the variations in data characteristics based on changes in scanning protocols. In such cases, enhanced reconstruction algorithms may generate inaccurate clinical images without users of the imaging system being aware of or alerted to the inaccurate images.

Systems and methods are disclosed herein for quality control and confidence verification of image reconstruction, including enhanced reconstruction techniques. Application of a detection and localization algorithm to one or both of imaging data reconstructed according to a baseline reconstruction technique and an enhanced reconstruction technique may be performed in order to detect lesion-like features of the imaging data, and determine a coordinate relative to an image volume for each of the detected lesion-like features. The image volume may be used to co-localize each detected lesion-like feature in images reconstructed with the baseline reconstruction technique to images reconstructed with the enhanced reconstruction technique and vice versa. An image value may be determined for each detected lesion-like feature. Statistical analysis may then be performed on a set of ratios between image values for the baseline reconstruction and the enhanced reconstruction in order to determine deviation of the enhanced reconstruction image values compared to the baseline reconstruction image values. Deviations exceeding a criteria (e.g., a threshold value or range) may be used to update and/or modify the enhanced reconstruction algorithm to improve quality control automatically. In some examples, the automatic quality control method herein disclosed may automatically modify an enhanced reconstruction algorithm based on determined deviations (including direction and magnitude of deviation). In other examples, the method may output statistical analysis results to a user in order to inform the user if an image generated by an enhanced reconstruction algorithm deviates more than a defined threshold, prompting the user to trigger modification of the enhanced reconstruction algorithm. The method for automatic quality control may be performed continuously (e.g., iteratively) to repeatedly update an enhanced reconstruction algorithm and may be performed at various medical facilities on various imaging systems, resulting in different updates to the enhanced reconstruction algorithm. In some examples, iterative updates to enhanced reconstruction algorithms may be stored in memory and used downstream, for example for training of deep learning models.

In some examples, the automatic quality control method herein described may be performed at various times, whereby statistical characteristics and sets of ratios are determined for image data at multiple times, the image data of each patient being acquired by the same imaging system. In this way, variations in imaging system scanning protocol (e.g., administered dosage, radiotracer type, etc.) that occur over time may be accounted for when updating the enhanced reconstruction algorithm.

In this way, potential inaccurate images may be detected and enhanced reconstruction algorithms may be automatically updated in order to reduce inaccurate generations. Updating and modifying enhanced reconstruction algorithms may allow for more accurate enhanced reconstruction of images. Enhanced reconstruction algorithms may allow for higher contrast recovery and small-lesion detection compared to baseline reconstruction algorithms, and therefore quality control as accomplished by the methods described herein provide for increased use in clinical settings by decreasing potential inaccurate image generation. Further, computer processing demands may be reduced by way of reduction in repeat image acquisitions and/or reconstructions that would result from inaccuracies. A statistical approach may allow for more consistent updates to the enhanced reconstruction algorithm over a wide range of imaging regions and/or types of data.

Figure 2:
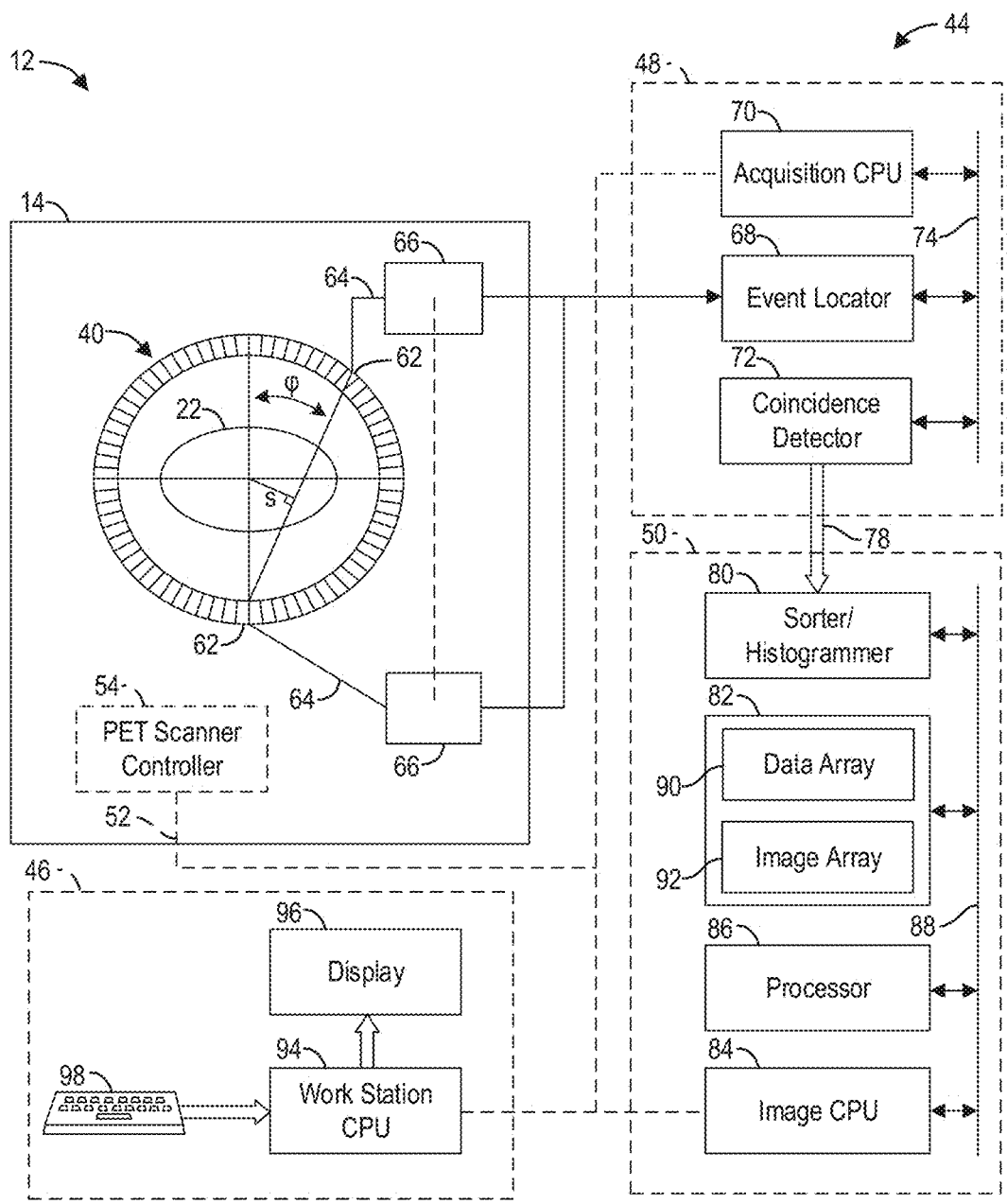
FIG. 2 is a block schematic diagram of an imaging system with a detector, according to an embodiment of the invention.
Figure 9:
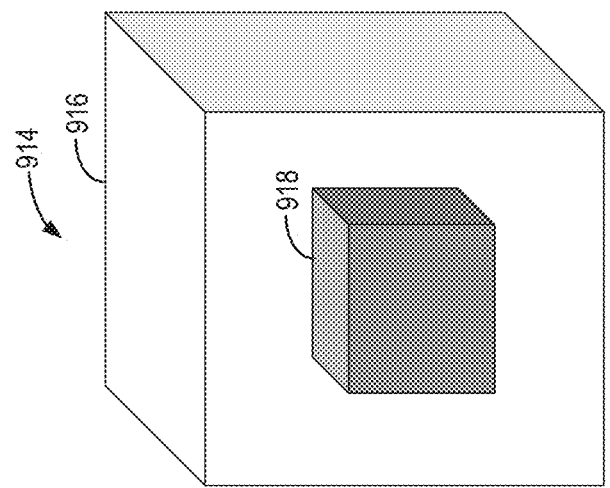
FIG. 9 shows an illustration of filter kernels used for image feature detection.
Figure 9:
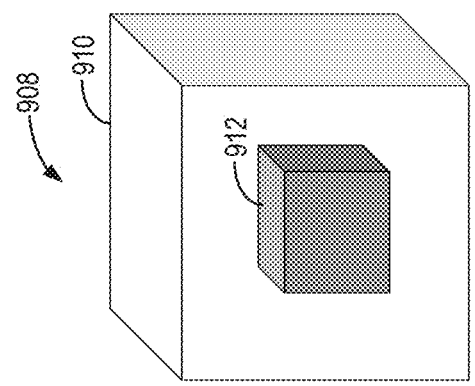
Figure 9:
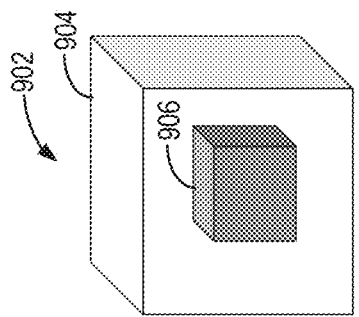
Figure 10:
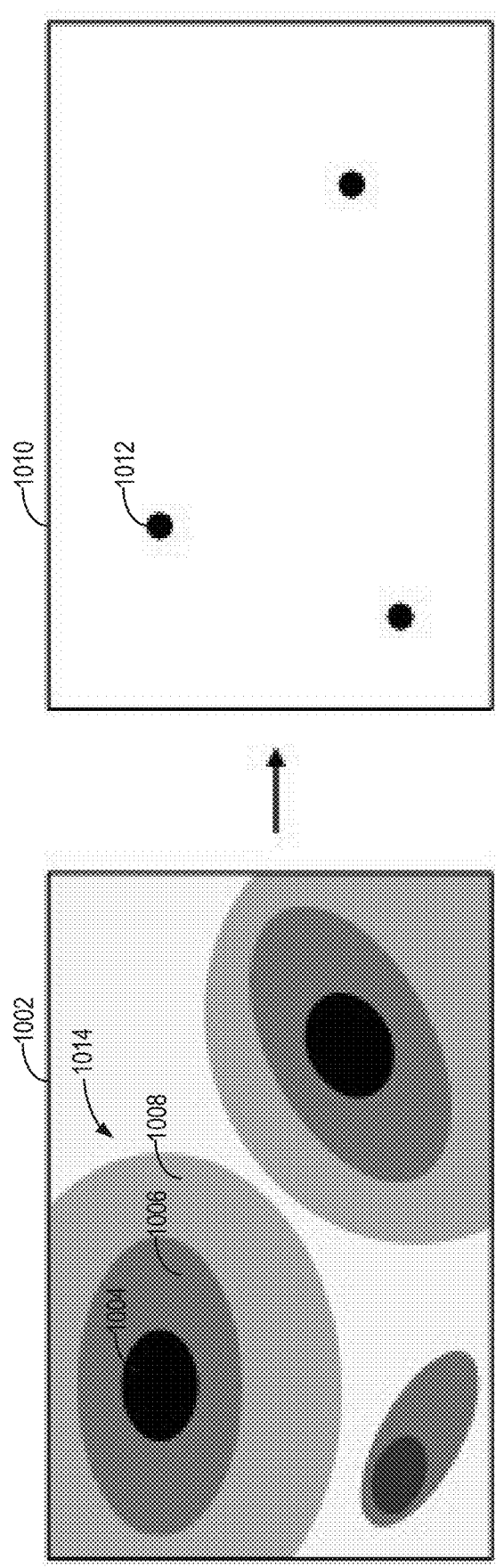
FIG. 10 shows an illustration of a volumetric spatial weight map and a coordinate map.
Figure 11:
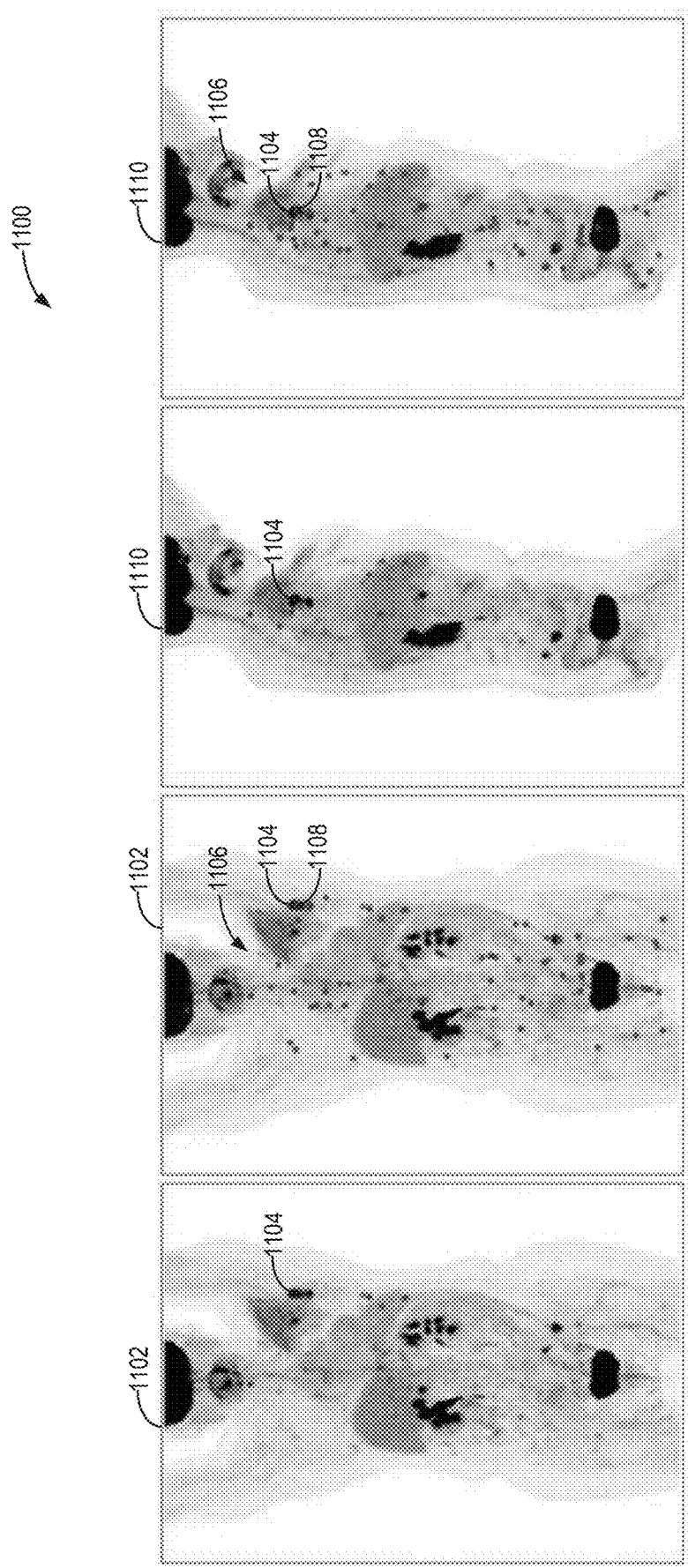
FIG. 11 shows an example of a reconstructed image from multiple views.
Figure 12:
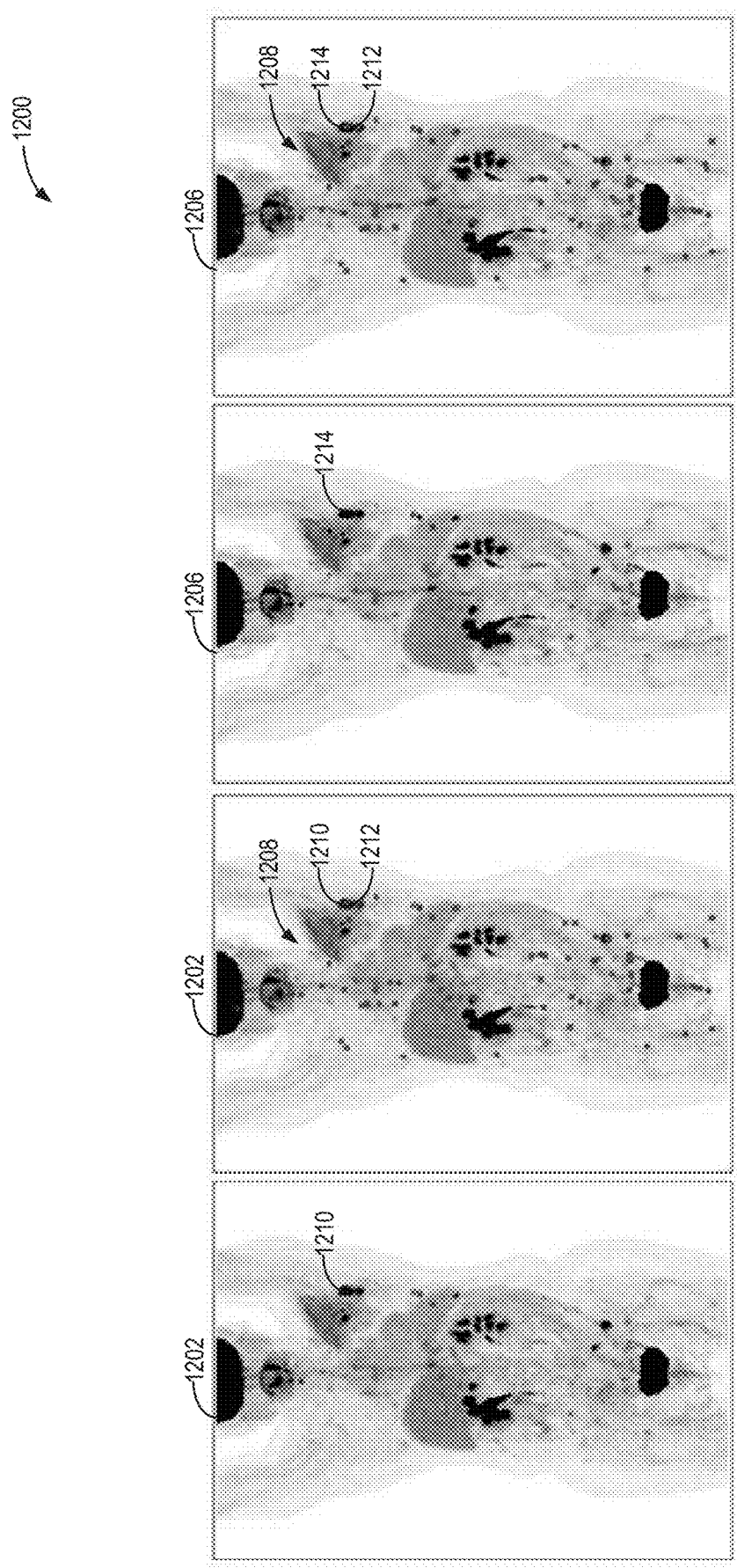
FIG. 12 shows an example of baseline and enhanced reconstruction images.
Figure 13:
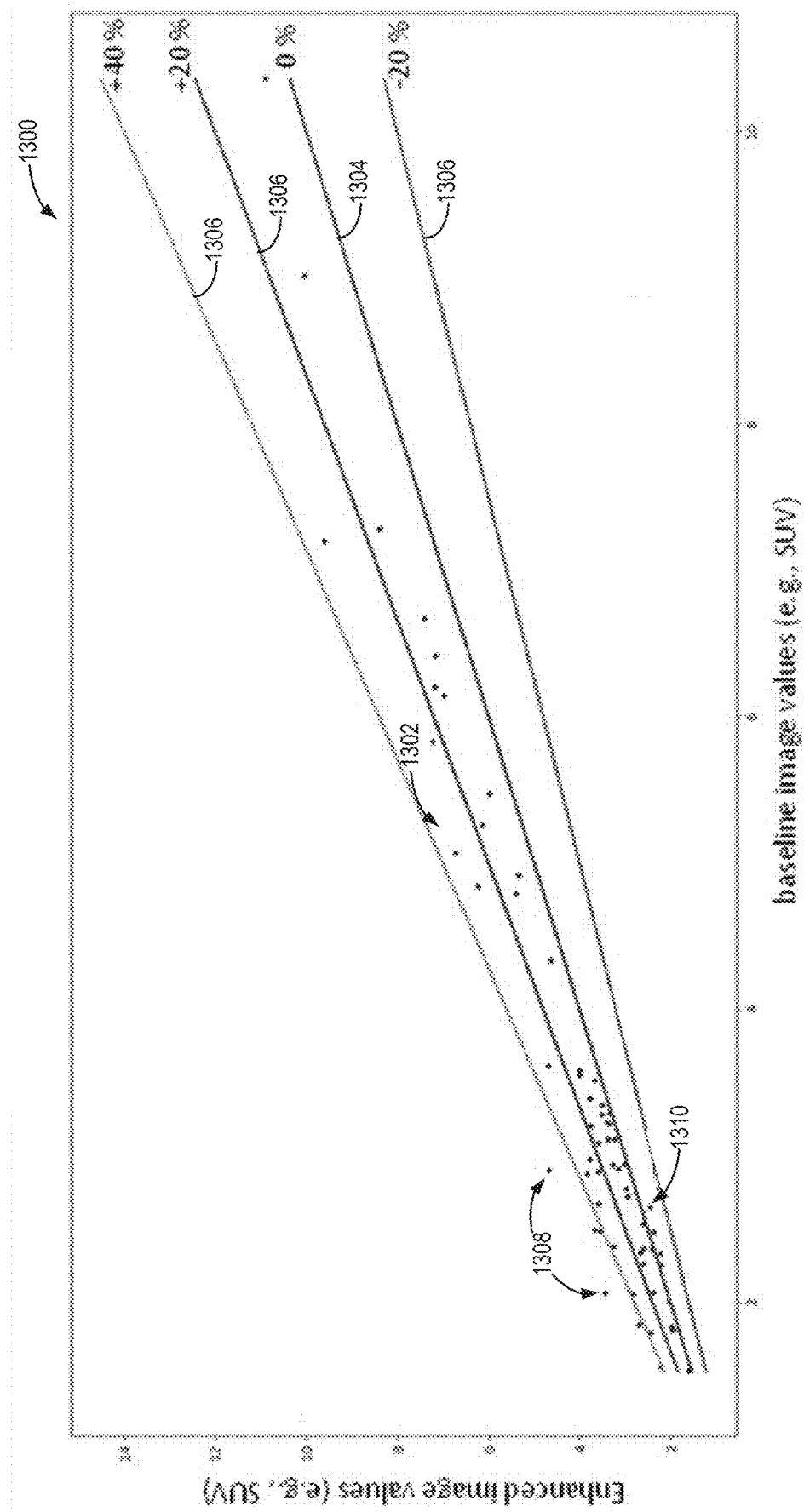
FIG. 13 shows an example of a graph of a statistical distribution of a set of ratios of image values of baseline and enhanced reconstruction images.

Various embodiments of the invention provide a multi-modality imaging system 10 as shown in FIGS. 1 and 2. Multi-modality imaging system 10 may be any type of imaging system, for example, different types of medical imaging systems, such as a PET, a Single Photon Emission Computed Tomography (SPECT), a Computed Tomography (CT), an ultrasound system, Magnetic Resonance Imaging (MRI), or any other system capable of generating tomographic images. The various embodiments are not limited to multi-modality medical imaging systems, but may be used on a single modality medical imaging system such as a stand-alone PET imaging system or a stand-alone SPECT imaging system, for example. Moreover, the various embodiments are not limited to medical imaging systems for imaging human subjects, but may include veterinary or non-medical systems for imaging non-human objects. Various methods for automatic quality control implemented on images generated by the multi-modality imaging system 10 are illustrated in flowcharts in FIGS. 3-8. Illustrations of filter kernels used for feature detection are shown in FIG. 9. An illustration of an example volumetric spatial weight map and corresponding coordinate map are shown in FIG. 10. Examples of reconstructed images as generated from baseline reconstruction algorithms and/or enhanced reconstruction algorithms on data from the multi-modality imaging system 10 are shown in FIGS. 11-12. A graph of an output of a statistical analysis is shown in FIG. 13.

Referring to FIG. 1, the multi-modality imaging system 10 includes a first modality unit 11 and a second modality unit 12. The two modality units enable the multi-modality imaging system 10 to scan an object or patient in a first modality using the first modality unit 11 and a second modality using the second modality unit 12. The multi-modality imaging system 10 allows for multiple scans in different modalities to facilitate an increased diagnostic capability over single modality systems. In one embodiment, multi-modality imaging system 10 is a Computed Tomography/Positron Emission Tomography (CT/PET) imaging system 10, e.g., the first modality 11 is a CT imaging system 11 and the second modality 12 is a PET imaging system 12. The CT/PET system 10 is shown as including a gantry 13 representative of a CT imaging system and a gantry 14 that is associated with a PET imaging system. As discussed above, modalities other than CT and PET may be employed with the multi-modality imaging system 10.

The gantry 13 includes an x-ray source 15 that projects a beam of x-rays toward a detector array 18 on the opposite side of the gantry 13. Detector array 18 is formed by a plurality of detector rows (not shown) including a plurality of detector elements which together sense the projected x-rays that pass through a medical patient 22. Each detector element produces an electrical signal that represents the intensity of an impinging x-ray beam and hence allows estimation of the attenuation of the beam as it passes through the patient 22. During a scan to acquire x-ray projection data, gantry 13 and the components mounted thereon rotate about a center of rotation.

FIG. 2 is a block schematic diagram of the PET imaging system 12 illustrated in FIG. 1 in accordance with an embodiment of the present invention. The PET imaging system 12 includes a detector ring assembly 40 including a plurality of detector crystals. The PET imaging system 12 also includes a processor or controller 44, to control normalization, image reconstruction processes and perform calibration. Controller 44 is coupled to an operator workstation 46. Controller 44 includes a data acquisition processor 48 and an image reconstruction processor 50, which are interconnected via a communication link 52. PET imaging system 12 acquires scan data and transmits the data to data acquisition processor 48. The scanning operation is controlled from the operator workstation 46. The data acquired by the data acquisition processor 48 is reconstructed using the image reconstruction processor 50.

The detector ring assembly 40 includes a central opening, in which an object or patient, such as patient 22 may be positioned using, for example, a motorized table 24 (shown in FIG. 1). The motorized table 24 is aligned with the central axis of detector ring assembly 40. This motorized table 24 moves the patient 22 into the central opening of detector ring assembly 40 in response to one or more commands received from the operator workstation 46. A PET scanner controller 54, also referred to as the PET gantry controller, is provided (e.g., mounted) within PET system 12. The PET scanner controller 54 responds to the commands received from the operator workstation 46 through the communication link 52. Therefore, the scanning operation is controlled from the operator workstation 46 through PET scanner controller 54.

During operation, when a photon collides with a crystal 62 on a detector ring 40, it produces a scintillation event on the crystal. Each photomultiplier tube or photosensor produces an analog signal that is transmitted on communication line 64 when a scintillation event occurs. A set of acquisition circuits 66 is provided to receive these analog signals. Acquisition circuits 66 produce digital signals indicating the three-dimensional (3D) location and total energy of the event. The acquisition circuits 66 also produce an event detection pulse, which indicates the time or moment the scintillation event occurred. These digital signals are transmitted through a communication link, for example, a cable, to an event locator circuit 68 in the data acquisition processor 48.

The data acquisition processor 48 includes the event locator circuit 68, an acquisition CPU 70, and a coincidence detector 72. The data acquisition processor 48 periodically samples the signals produced by the acquisition circuits 66. The acquisition CPU 70 controls communications on a back-plane bus 74 and on the communication link 52. The event locator circuit 68 processes the information regarding each valid event and provides a set of digital numbers or values indicative of the detected event. For example, this information indicates when the event took place and the position of the scintillation crystal 62 that detected the event. An event data packet is communicated to the coincidence detector 72 through the back-plane bus 74. The coincidence detector 72 receives the event data packets from the event locator circuit 68 and determines if any two of the detected events are in coincidence. Coincidence is determined by a number of factors. First, the time markers in each event data packet must be within a predetermined time period, for example, 12.5 nanoseconds, of each other. Second, the line-of-response (LOR) formed by a straight line joining the two detectors that detect the coincidence event should pass through the field of view in the PET imaging system 12. Events that cannot be paired are discarded. Coincident event pairs are located and recorded as a coincidence data packet that is communicated through a physical communication link 78 to a sorter/histogrammer 80 in the image reconstruction processor 50.

The image reconstruction processor 50 includes the sorter/histogrammer 80. During operation, sorter/histogrammer 80 generates a data structure known as a histogram. A histogram includes a large number of cells, where each cell corresponds to a unique pair of detector crystals in the PET scanner. Because a PET scanner typically includes thousands of detector crystals, the histogram typically includes millions of cells. Each cell of the histogram also stores a count value representing the number of coincidence events detected by the pair of detector crystals for that cell during the scan. At the end of the scan, the data in the histogram is used to reconstruct an image of the patient. The completed histogram containing all the data from the scan is commonly referred to as a "result histogram." The term "histogrammer" generally refers to the components of the scanner, e.g., processor and memory, which carry out the function of creating the histogram.

The image reconstruction processor 50 also includes a memory module 82, an image CPU 84, an array processor 86, and a communication bus 88. During operation, the sorter/histogrammer 80 counts all events occurring along each projection ray and organizes the events into 3D data. This 3D data, or sinogram, is organized in one exemplary embodiment as a data array 90. Data array 90 is stored in the memory module 82. The communication bus 88 is linked to the communication link 52 through the image CPU 84. The image CPU 84 controls communication through communication bus 88. The array processor 86 is also connected to the communication bus 88. The array processor 86 receives data array 90 as an input and reconstructs images in the form of image array 92. The image reconstruction processor 50 may employ one or more reconstruction methods to reconstruct images. For example, the image reconstruction processor 50 may employ a baseline reconstruction algorithm such as OSEM or other MLEM and/or an enhanced reconstruction algorithm such as BSREM or a deep learning algorithm. Images reconstructed from different reconstruction methods may vary in how 3D data is used to form the image array 92 and therefore image arrays 92 formed through different reconstruction methods may differ. Resulting image arrays 92, from one or more of the reconstruction methods, may then be stored in memory module 82.

The images stored in the image array 92 are communicated by the image CPU 84 to the operator workstation 46. The operator workstation 46 includes a CPU 94, a display 96, and an input device 98. The CPU 94 connects to communication link 52 and receives inputs, e.g., user commands, from the input device 98. The input device 98 may be, for example, a keyboard, mouse, a touch-screen panel, and/or a voice recognition system, and so on. Through input device 98 and associated control panel switches, the operator can control the operation of the PET imaging system 12 and the positioning of the patient 22 for a scan. The operator may also control which of the reconstruction methods are employed to reconstruct images. Similarly, the operator can control the display of the resulting image on the display 96 and can perform image-enhancement functions using programs executed by the workstation CPU 94.

The detector ring assembly 40 includes a plurality of detector units. The detector unit may include a plurality of detectors, light guides, scintillation crystals and analog application specific integrated chips (ASICs). For example, the detector unit may include twelve SiPM devices, four light guides, 144 scintillation crystals, and two analog ASICs.

Figure 3:
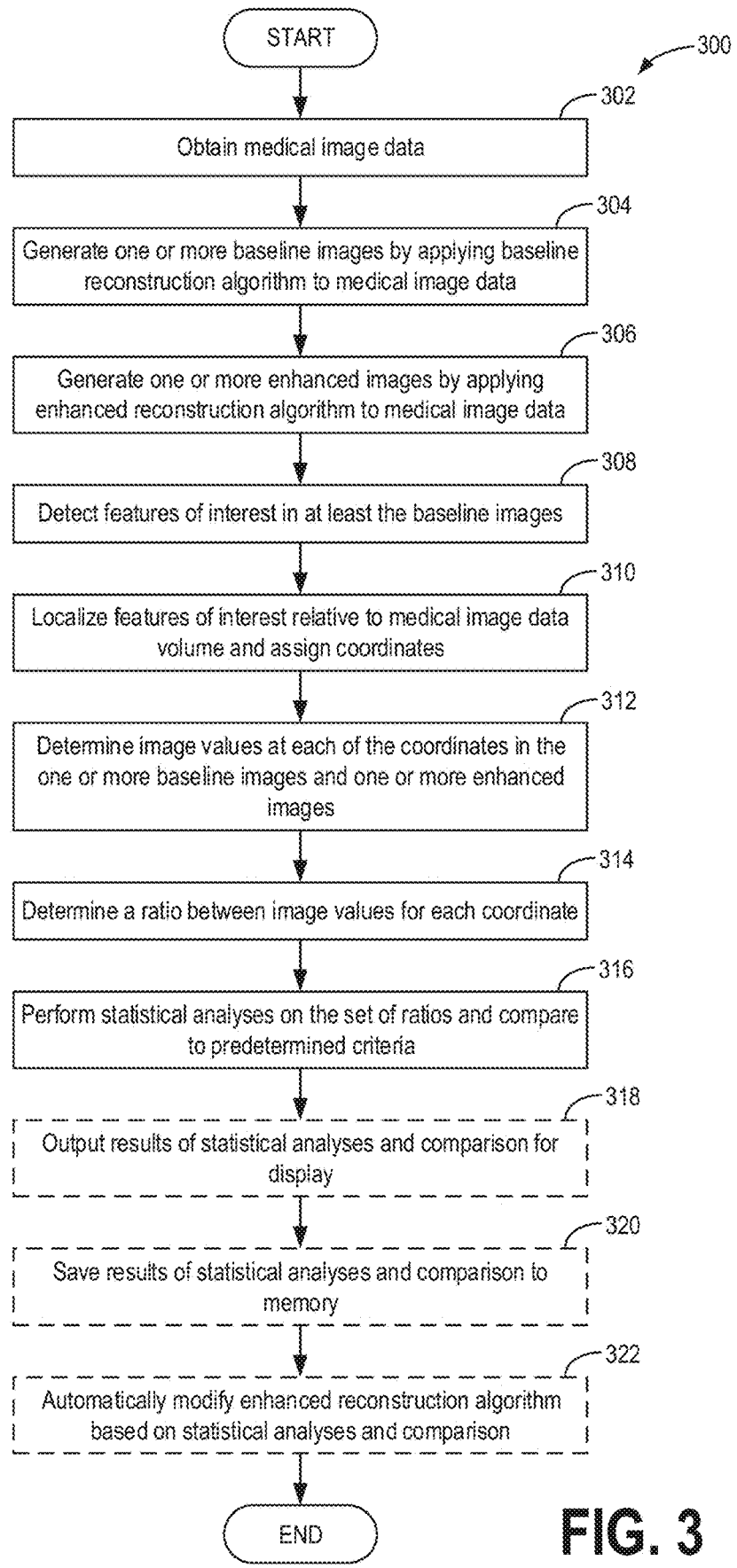
FIG. 3 is a flowchart illustrating a method for quality control of enhanced image reconstruction.

Turning now to FIG. 3, a flowchart illustrating an example method 300 for quality control of an enhanced reconstruction algorithm is shown. Method 300 may be carried out using the systems and components described herein above with regard to FIGS. 1-2. For example, the method 300 may be carried out according to instructions stored in memory of one or more controllers, processors, and/or computing devices included as part of and/or communicatively or operatively coupled to an imaging system, such as image reconstruction processor 50 of PET imaging system 12 of multi-modality imaging system 10 described with reference to FIGS. 1-2.

At 302, method 300 includes obtaining medical image data. The medical image data may be obtained by an imaging system, such as multi-modality imaging system 10 of FIGS. 1-2. The medical image data may be three dimensional, thereby defining a medical image data volume. The medical image data may be PET-CT data, CT data, standalone PET data, SPECT data, MRI data, ultrasound data, or the like. The medical image data may be obtained of one or more patients and/or one or more patient groups. In some examples, the medical image data may be obtained at multiple times, e.g., longitudinally, to account for changes in scanner profile along time. Depending on the type of medical image data, a goal of the quality control of the enhanced reconstruction algorithm may differ. For example, for PET, PET-CT, and/or SPECT, quality control may be aimed at increasing conspicuity of small radiotracer uptakes and overall quantitative accuracy while maintaining or reducing image noise in surrounding areas. For CT, MRI, and ultrasound, quality control may be aimed at increasing conspicuity of fine anatomical structures and reducing image noise.

At 304, method 300 includes generating one or more baseline images by applying a baseline reconstruction algorithm to the medical image data. Baseline image reconstruction may be performed by an image reconstruction processor (e.g., image reconstruction processor 50) to generate one or more images in the form of an image array, as described with reference to FIG. 2. Baseline image reconstruction may be performed by execution of the baseline reconstruction algorithm, such as OSEM, by the image reconstruction processor. One or more baseline images may be generated for each patient in each patient group, in such examples in which data of multiple patients and/or multiple groups of patients are included in the medical image data.

At 306, method 300 includes generating one or more enhanced images by applying an enhanced reconstruction algorithm to the medical image data (e.g., the same medical image data as reconstructed by the baseline reconstruction algorithm). Enhanced image reconstruction may be performed by the image reconstruction processor to generate one or more images in the form of an image array, as described with reference to FIG. 2. Enhanced image reconstruction may be performed by execution of the enhanced reconstruction algorithm, such as BSREM, by the image reconstruction processor. One or more enhanced images may be generated for each patient in each patient group, in such examples in which data of multiple patients and/or multiple groups of patients are included in the medical image data.

At 308, method 300 includes detecting features of interest in at least the baseline images. Features of interest may be predetermined based on the type of medical image data being reconstructed, where the type of feature of interest detected is relevant to the type of medical image data. For example, for PET data, predetermined features of interest may be areas of increased radiotracer uptake (e.g., lesion-like features). As another example, for CT data, predetermined features of interest may be small bone structures, such as at the edges of vertebrae or cortical bone of ribs. As yet another example, for MRI data, predetermined features of interest may be edges between different types of tissue, for example between gray and white matter in a brain or between fat and muscle tissue in specific organs of interest.

At 310, method 300 includes localizing the features of interest relative to the medical image data volume and assigning coordinates for each feature of interest. A coordinate system may be defined for the medical image data volume. Each of the features of interest may be localized within the coordinate system. In some examples, assigned coordinates may be localized for a specified feature of interest based on a local maximum of the feature of interest. In other examples, a coordinate may be localized for a feature of interest as a center point of the feature of interest. Each of the coordinates together may define and be included in a coordinate map that may be overlaid on the one or more baseline and/or enhanced images.

At 312, method 300 includes determining image values at each of the coordinates in the one or more baseline images and the one or more enhanced images. An image value may be an absolute value, such as standard uptake values (SUVs) for PET, PET-CT, and/or SPECT imaging or a relative value, such as image values relative to a surrounding (e.g., feature contrast) or a background. An SUV may be determined based on tissue radioactivity concentration in relation to concentration of total injected dose of radiotracer. The concentration of the total injected dose may be a ratio of an injected amount and the patient's body weight.

In some examples, each coordinate may have two image values, one identified in a baseline image and one identified in an enhanced image. In some examples, the image values for a specified coordinate may be determined based on a local maximum within a defined volume around the coordinate, for example the local maximum within a 5 mm$^3$ region around the coordinate. In other examples, the images values for the specified coordinate may be determined based on the value at the specified coordinate.

At 314, method 300 includes determining a ratio between image values for each coordinate. As explained, each coordinate may include two image values, a first image value from the baseline image and a second image value from the enhanced image. A ratio may be defined between the first and second image values for each coordinate. Each ratio may be included in a set of ratios. In some examples in which data of multiple patients are included in the medical image data, the set of ratios may include ratios of multiple patients. More than one set of ratios may be generated in examples in which multiple patient groups are included in the medical image data. For example, a first set of ratios may correspond to a first group of patient data and a second set of ratios may correspond to a second group of patient data. Statistical analyses may be performed for individual ratios, a set of ratios, and between multiple sets of ratios, as will be further described below. In some examples, each ratio may be a ratio of the enhanced image value to the baseline image value such as to define a relative enhancement of the enhanced image with respect to the baseline image.

At 316, method 300 includes performing statistical analyses on the set of ratios and comparing to predetermined criteria. In examples in which a single set of ratios is generated, statistical analyses may include determining one or more statistical characteristics of the set of ratios. The one or more statistical characteristics may include a mean ratio, a mean relative enhancement, a standard deviation, a distribution of ratios, among others. The mean ratio may be an average of two or more ratios in the set of ratios, for example an average of all the ratios in the set of ratios. The mean relative enhancement may be defined by the mean ratio, for example a mean ratio of 1.4 may define a mean relative enhancement of 40%.

Each of the one or more statistical characteristics determined by the statistical analyses may be compared to predetermined criteria. The predetermined criteria may include a range or a threshold. For example, a range criteria of mean relative enhancements may be defined as from 32% to 42% and a standard deviation may have a threshold of 5%. Predetermined criteria may be set based on facility parameters, prior research, and/or the like. Comparison between the one or more statistical characteristics and a predetermined criterion that corresponds may determine which of the one or more statistical characteristics deviate outside of the predetermined criteria. Deviations may include a direction, e.g., positive or negative, compared to the predetermined criteria.

In some examples, each of the one or more statistical characteristics determined by the statistical analyses may be compared to a reference set of ratios. For example, a first group of patient data may be a reference group and one or more statistical characteristics defined for the first group of patient data may be reference characteristics. One or more statistical characteristics for a second group of patient data may then be compared to the reference characteristics.

At 318, method 300 optionally includes outputting results of the statistical analyses and comparison for display. The results may be displayed on a display device (e.g., display 96 of operator workstation 46). A user of the display device may utilize the results to inform decisions of updating the enhanced reconstruction algorithm.

At 320, method 300 optionally includes saving results of the statistical analyses and comparison to memory. For example, the results may be saved to memory module 82 referenced in FIG. 2, or other non-transitory memory of a processor of multi-modality imaging system 10 of FIGS. 1-2. Once saved in memory, the results of the statistical analyses may be used in downstream processes, for example in modification of the enhanced reconstruction algorithm or in training for deep learning algorithms.

At 322, method 300 optionally includes automatically modifying the enhanced reconstruction algorithm based on the statistical analyses and comparison. The enhanced reconstruction algorithm may include one or more modifiable parameters that may be modified automatically based on statistical analyses and comparison of the statistical analyses to predetermined criteria and/or reference characteristics. For example, an enhancement strength parameter may be decreased in response to a statistical characteristic of mean relative enhancement being determined as deviated in a positive direction (e.g., higher) in comparison to a predetermined criteria.

In some examples, the enhanced reconstruction algorithm may be applied again to the medical image data to generate one or more repeat enhanced images. Statistical analyses may be performed as described above again in order to verify whether the modifications made to the enhanced reconstruction algorithm altered resultant statistical characteristics to align with predetermined criteria (e.g., no deviations determined for the repeat images). Modification and verification may be performed continuously (e.g., iteratively) until no deviations are determined, as will be described with respect to FIG. 8.

In some examples, modification of the enhanced reconstruction algorithm may be triggered by user input. For example, in such examples in which results of the statistical analyses are outputted for display to the user, the user may prompt modification of the algorithm via user input to the display device.

In this way, the method 300, and other methods described below, may increase accuracy of enhanced image reconstruction by way of updating the enhanced reconstruction algorithm with respect to a specific imaging system. Increased accuracy of enhanced image reconstruction may increase clinical use of the reconstructed images, reduce processing demands of the computing device by avoiding need for repeat image acquisition and/or reconstruction, and reduce storage of inaccurate reconstructed images in memory. Further, increased accuracy of the enhanced reconstruction algorithm, which may in some examples be more computationally intensive than the baseline reconstruction algorithm, may increase speed of output of reconstructed images to the user.

Figure 4:
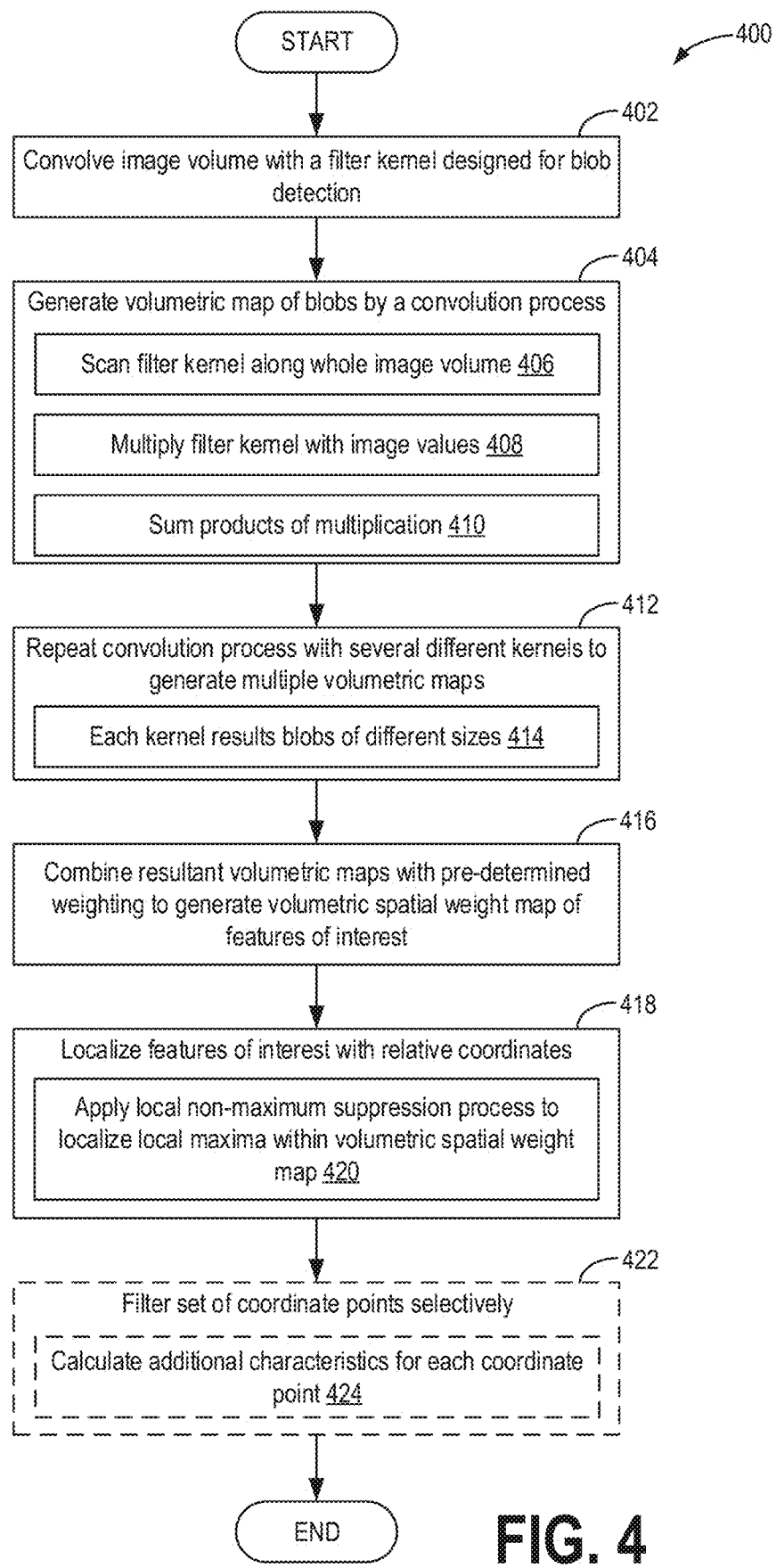
FIG. 4 is a flowchart illustrating a method for detection and localization.

Turning now to FIG. 4, a flowchart illustrating an example method 400 for detection and localization of image features of interest (e.g., lesion-like features) is shown. Method 400 may be carried out using the systems and components described herein above with regard to FIGS. 1-2. For example, the method 400 may be carried out according to instructions stored in memory of one or more controllers, processors, and/or computing devices included as part of and/or communicatively or operatively coupled to an imaging system, such as image reconstruction processor 50 of PET imaging system 12 of multi-modality imaging system 10 described with reference to FIGS. 1-2.

At 402, method 400 includes convolving an image volume with a filter kernel designed for blob detection. In some examples, the image volume may be a PET image volume. Convolving as described herein, is a process of transforming an image by applying a kernel over each pixel or voxel and its local neighbors across the entire image or image volume. A kernel, also known as a convolution matrix or mask, is a two-dimensional matrix or a three-dimensional array of numbers that is applied to an image in order transform the image. The filter kernel herein described may be designed for blob detection, for example a Laplacian of the Gaussian, a difference of Gaussians, or other, that evaluates for characteristics such as size, shape, absolute image values, image values relative to close surroundings (e.g., feature contrasts), image values relative to estimated normal background in relevant organs and tissues, position relative to known identified organs (e.g., using CT image data), estimated image noise, and the like.

Blob detection methods are aimed at detecting a region of an image that differ in properties, such as brightness or color, compared to surrounding regions. For example, in PET imaging, a blob may be a collection of one or more pixels with relatively high (or relatively low) intensity (e.g., brightness) compared to nearby pixels. A blob may be a region with increased radiotracer uptake that results in high intensity pixels following image reconstruction. The filter kernel may be tuned to detect blobs relevant to the type of medical image data in use.

At 404, method 400 includes generating a volumetric map of blobs by a convolution process. A coordinate system of the volumetric map as herein described may be relative to the image volume onto which the filter kernel is applied. The convolution process may include scanning the filter kernel along the whole image volume, as noted at 406. The filter kernel may be scanned against/applied to collections of pixels within the whole image volume to detect blobs (e.g., detecting regions of increased or decreased brightness, depending on type of filter kernel used). The filter kernel value (e.g., the two-dimensional matrix or the three-dimensional array) may then be multiplied with image values of the detected blobs, as noted at 408. The product of the multiplication of the filter kernel with the image values may then be summed, as noted at 410. In some examples, summing may be performed following normalization of the convolution (e.g., normalizing an input).

At 412, method 400 includes repeating the convolution process, as described at 404, for several different kernels to generate multiple volumetric maps. Each of the several different kernels may detect blobs of different sizes, as noted at 414. For example, a first filter kernel may detect blobs up to a first size while a second filter kernel may detect blobs up to a second size larger than the first size. For practical clinical diagnostic purposes, a typical range of blob sizes is, for example, between 1 mm and 10 mm in each of the three orthogonal directions of the image volume.

At 416, method 400 includes combining the multiple resultant volumetric maps with a predetermined weighting to generate a volumetric spatial weight map of features of interest. Each of the multiple resultant volumetric maps may include blobs of a specific size. Each of the multiple resultant volumetric maps are combined into the volumetric spatial weight map such that the volumetric spatial weight map includes blobs of multiple sizes. Blobs in the volumetric spatial weight map may overlap, for example a blob of a first size and a blob of a second size may overlap at a particular position within the volumetric spatial weight map. Each of the blobs or groups of overlapping blobs included in the volumetric spatial weight map may be defined as a feature of interest (e.g., a lesion-like feature). In some examples, blobs of different sizes may be assigned different weights. In this way, features of interest of various sizes may be projected in a single volumetric map.

At 418, method 400 includes localizing features of interest with relative coordinates. Each of the defined features of interest within the volumetric spatial weight map may be localized with coordinates in the coordinate system relative to the image volume. Each of the features of interest included in the volumetric spatial weight map may include a local maxima and a local non-maximum suppression process may be applied to localize the local maxima for each feature of interest, as noted at 420. Localized coordinates of each of the local maxima may define coordinate points for each of the features of interest. Each coordinate point may be included in a set of coordinate points (e.g., a coordinate map) for the volumetric spatial weight map. Each coordinate point may be a three dimensional location within the image volume defined by an x-coordinate, a y-coordinate, and a z-coordinate.

At 422, method 400 includes optionally filtering the set of coordinate points selectively. Selective filtering may remove features determined to be less relevant with respect to meaningful clinical uptakes (e.g., removing coordinate points corresponding to an anatomical region that has clinically insignificant uptake, for example uptake in a urinary tract as a result of FDG accumulation in urine). In this way, coordinates of features determined to be clinically relevant may remain in the set of coordinate points. In order to determine which of the coordinates are considered relevant, a plurality of additional characteristics may be calculated for each coordinate point, as noted at 424. Such additional characteristics may include, in some examples, image feature contrast (e.g., image value of the feature of interest in the volumetric spatial weight map), range of image values on the coordinate, either as absolute, such as on an SUV scale, or relative to a calculated normal tissue background (e.g., global background for the entire image volume or a local surrounding background), and/or anatomical location of coordinate points, for example if a feature of interest is close respective to specific organs or regions of interest. These additional characteristics may be tested relative to predetermined criteria in order to filter the set of coordinate points to keep the most relevant features of interest in the volumetric spatial weight map. In some examples, filtering the set of coordinate points may be omitted if all the features of interest in the volumetric spatial weight map are considered to be relevant.

Method 400 as herein described provides an example of a detection and localization method. In other examples, various variations and/or modifications may be made to the method with a similar result. The detection and localization method/algorithm herein described, as well as other various possible algorithms, may detect features of interest within a reconstructed medical image and localize those features of interest with respect to the image volume. In some examples, the detection and localization algorithm may also include determining image value of each of the features of interest. This may be done as part of a filtering process or as part of a separate step in the method. Alternatively, image value may be determined for each feature of interest following completion of the detection and localization method. Detecting and localizing each feature of interest may allow for statistical analyses to be performed on various reconstructed images of the same image data (e.g., PET-CT data) in order to determine potential deviations in characteristics such as image value of features of interest in each of the various reconstructed images.

Figure 5:
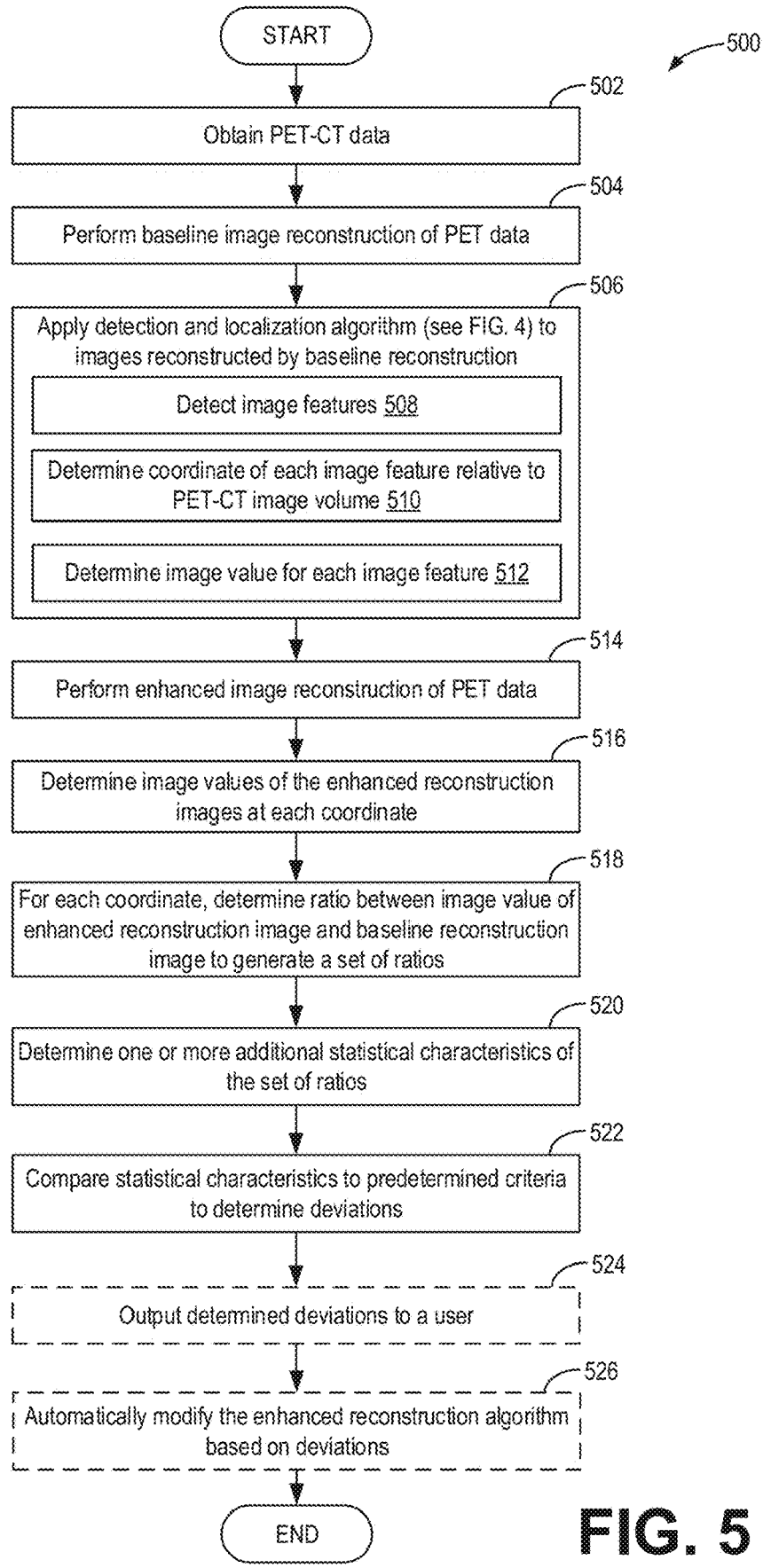
FIG. 5 is a flowchart illustrating an example method for quality control of an enhanced image reconstruction algorithm.

Turning now to FIG. 5, a flowchart illustrating an example method 500 for automatic quality control of an enhanced reconstruction algorithm applied to medical image data is shown. Method 500 may be carried out using the systems and components described herein above with regard to FIGS. 1-2. For example, the method 500 may be carried out according to instructions stored in memory of one or more controllers, processors, and/or computing devices included as part of and/or communicatively or operatively coupled to an imaging system, such as image reconstruction processor 50 of PET imaging system 12 of multi-modality imaging system 10 described with reference to FIGS. 1-2. Method 500 is described with reference to reconstruction of PET data, though it should be understood that method 500 may be performed for other medical imaging data, as described with reference to FIG. 3.

At 502, method 500 includes obtaining PET-CT data. PET-CT data may be obtained with an imaging system (e.g., multi-modality imaging system 10 of FIG. 1). The PET-CT data may include CT data acquired by a CT system (e.g., CT imaging system 11) and PET data acquired by a PET system (e.g., PET imaging system 12). In some examples, PET-CT data may be acquired of a single patient. In other examples, PET-CT data may be acquired of a plurality of patients. In some examples, CT data of the PET-CT data may be reconstructed separately from PET data of the PET-CT data.

At 504, method 500 includes performing baseline image reconstruction of the PET data. Baseline image reconstruction may be performed by an image reconstruction processor (e.g., image reconstruction processor 50) to generate one or more images in the form of an image array, as described with reference to FIG. 2. Baseline image reconstruction may be performed by execution of a baseline reconstruction algorithm, such as OSEM, by the image reconstruction processor.

At 506, method 500 includes applying a detection and localization algorithm to images reconstructed by the baseline image reconstruction. In some examples, the baseline image reconstruction may generate one or more images and the detection and localization algorithm may be applied to each of the one or more images. In other examples, the one or more images may be projected as a single image (e.g., as a maximum intensity projection (MIP) image) and the detection and localization algorithm may be applied to the projected image.

The detection and localization algorithm, as described with reference to FIG. 4, may include detecting image features within each of the images, as noted at 508. Detection of image features may include evaluation of an image volume for characteristics such as size, shape, absolute image values like an SUV, image values relative to close surroundings (e.g., feature contrasts), image values relative to estimated normal background in relevant organs and tissues, position relative to known identified organs (e.g., using CT image data), estimated image noise, and the like, as described with reference to FIG. 4. In some examples, the image features may be predetermined image features of interest based upon type of image data (e.g., PET data), as described above with reference to FIG. 3.

The detection and localization algorithm, as described with reference to FIG. 4, may further include determining a coordinate of each image feature relative to the PET-CT image volume, as noted at 510. A coordinate (e.g., a three-dimensional point having an x-coordinate, a y-coordinate, and a z-coordinate) may be determined for the detected image feature. In some examples, the coordinates assigned to each of the detected image features may be relative to the PET-CT image volume, wherein the image volume is provided with a defined coordinate system in which each of the image features may be localized. A coordinate map including coordinates of each image feature may be generated as well.

The method 500 may further include determining an image value for each of the image features detected at 508, as noted at 512. The image value determined and assigned to each of the detected image features may be an absolute image value such as an SUV or a relative image value (e.g., relative to surrounding features or to an estimated normal background). The determined image value may be a maximum value detected within a specified volume around a corresponding coordinate (e.g., the maximum value within a 5 mm$^3$ volume around the coordinate point). The determined image value may be a non-zero positive number. SUVs, for example, may be determined as a ratio of tissue radioactivity concentration to whole body contraction of total injected dose of radiotracer. The determined image value for each detected lesion-like feature of the baseline reconstructed images may be stored in memory of the image reconstruction processor.

At 514, method 500 includes performing enhanced image reconstruction of the PET-CT data. Enhanced image reconstruction may be performed by the same image reconstruction processor that performed the baseline image reconstruction. Enhanced image reconstruction may generate one or more images in the form of an image array, as described with reference to FIG. 2. Enhanced image reconstruction may be performed by execution of an enhanced reconstruction algorithm, such as BSREM, by the image reconstruction processor.

At 516, method 500 includes determining image values of the enhanced reconstruction images at each coordinate. The coordinate map generated for the baseline reconstruction images may be transposed onto the enhanced reconstruction images so that the coordinates are co-localized to the same image volume. The enhanced image reconstruction may be performed on the same PET data as the baseline image reconstruction and as such, the defined coordinate system relative to the PET-CT volume may be the same for both the enhanced and baseline reconstructions. Thus, the coordinates determined within baseline reconstruction images may be referenced for the enhanced reconstruction images as well. As such, for each coordinate of detected image features from the baseline reconstruction images, an image value may be determined for each coordinate in the enhanced reconstruction images (e.g., image values of the same type, for example absolute or relative, as determined for the baseline images). Image values at each of the coordinates may differ between the baseline reconstruction images and the enhanced reconstruction images because the baseline reconstruction algorithm and the enhanced reconstruction algorithm generate different images from the PET data.

At 518, method 500 includes, for each coordinate, determining a ratio between an image value of the enhanced reconstruction image and an image value of the baseline reconstruction image. Image values for image features with defined coordinates, as determined for the baseline reconstruction images at 512, may be compared to the image values at the same coordinates within the enhanced reconstruction images determined at 516. The comparison may result in a ratio between the image values. The ratio may be a non-zero positive number. A set of ratios may be determined that includes a ratio for each coordinate. In some examples, each ratio may be a ratio of the enhanced image value to the baseline image value such as to define a relative enhancement of the enhanced reconstruction image with respect to the baseline reconstruction image at a particular coordinate. For example, a ratio of 1.3 may define a relative enhancement of 30%, with a ratio of 1 indicating no relative enhancement (e.g., image values being equal to each other).

At 520, method 500 includes determining one or more additional statistical characteristics of the set of ratios. The one or more additional statistical characteristics may include mean of two or more of the ratios in the set of ratios (e.g., a mean of all ratios in the set of ratios), standard deviation of a distribution of the set of ratio values, percentages of data points (e.g., of a ratio) larger than or smaller than the standard deviation which defines outliers, difference between two of the ratios and/or difference divided by sum of two of the ratios, and the like. A mean ratio of the set of ratios may define a mean relative enhancement value as well.

Additionally, a statistical confidence level may be calculated for each of the statistical characteristics by way of a technique such as bootstrap analysis. The calculated statistical confidence level may also be used to determine minimal amount of ratios demanded in the set of ratios in order for statistical confidence to be achieved. In some examples, a predetermined confidence level may be defined that may be met in order for results to be considered true. For example, if too few data points (e.g., ratios) are included in the set, the predetermined confidence level for the one or more statistical characteristics may not be met and therefore results may not be considered supported from a probability standpoint.

At 522, method 500 includes comparing the one or more statistical characteristics to predetermined criteria to determine deviations. Prior research and/or clinical evaluation may determine a set of criteria for the comparison. For example, criteria for mean ratio and/or mean relative enhancement and a standard deviation may be predefined. Comparison between the one or more statistical characteristics and the predetermined criteria may determine which of the one or more statistical characteristics are deviations (e.g., a mean relative enhancement above or below a predetermined range).

Enhancement confidence may be determined based on number of deviations or severity of deviation from a threshold criteria. For example, enhanced reconstruction images with one or more statistical characteristics outside the predetermined criteria may be determined to have false-positive potential or false-negative potential. Deviations may be low or high, indicating that the enhanced reconstruction algorithm may be generating images with low enhancement or high enhancement, respectively.

At 524, method 500 optionally includes outputting determined deviations to a user. Outputting the determined deviations may notify the user that the enhanced reconstruction image may have false-positive or false-negative potential. Notification of such false-positive or false-negative potential may allow the user to take into consideration clinical significance of the image values of lesion-like features in the enhanced reconstruction images. Additionally, the user may indicate that modifications and/or updates are to be made to the enhanced image reconstruction method based on the determined deviations in order to increase accuracy of the method. Further, in some examples, the determined deviations, and other results of the statistical analyses may be saved to non-transitory memory.

At 526, method 500 optionally includes automatically modifying the enhanced reconstruction algorithm based on the deviations determined at 522. In some examples, in response to deviations being detected at 522, one or more parameters of the enhanced reconstruction algorithm may be automatically modified. For example, when a mean relative enhancement characteristic deviates above a predetermined criteria range, a parameter defining enhancement strength for the enhanced reconstruction algorithm may be modified to reduce mean relative enhancement. In this way, the image reconstruction processor equipped with the automatic quality control method(s) herein described, may automatically modify the enhanced reconstruction algorithm without user input, thereby reducing processing power and time spent. Modification of the enhanced reconstruction algorithm may increase accuracy of image reconstruction and increase clinical use of generated images, including, in some examples, increasing accuracy and use in downstream processes such as automated image segmentation, computer aided diagnosis, and the like. Further, processing demands to the computing device may be reduced as increased accuracy of image reconstruction may reduce need for repeated acquisitions and reconstructions as a result of inaccuracies, which therefore may increase speed of output of reconstructed images to the user. The modified enhanced reconstruction algorithm may be used to reconstruct subsequent diagnostic images generated by the imaging system. Following 526, the method 500 may end.

Figure 6:
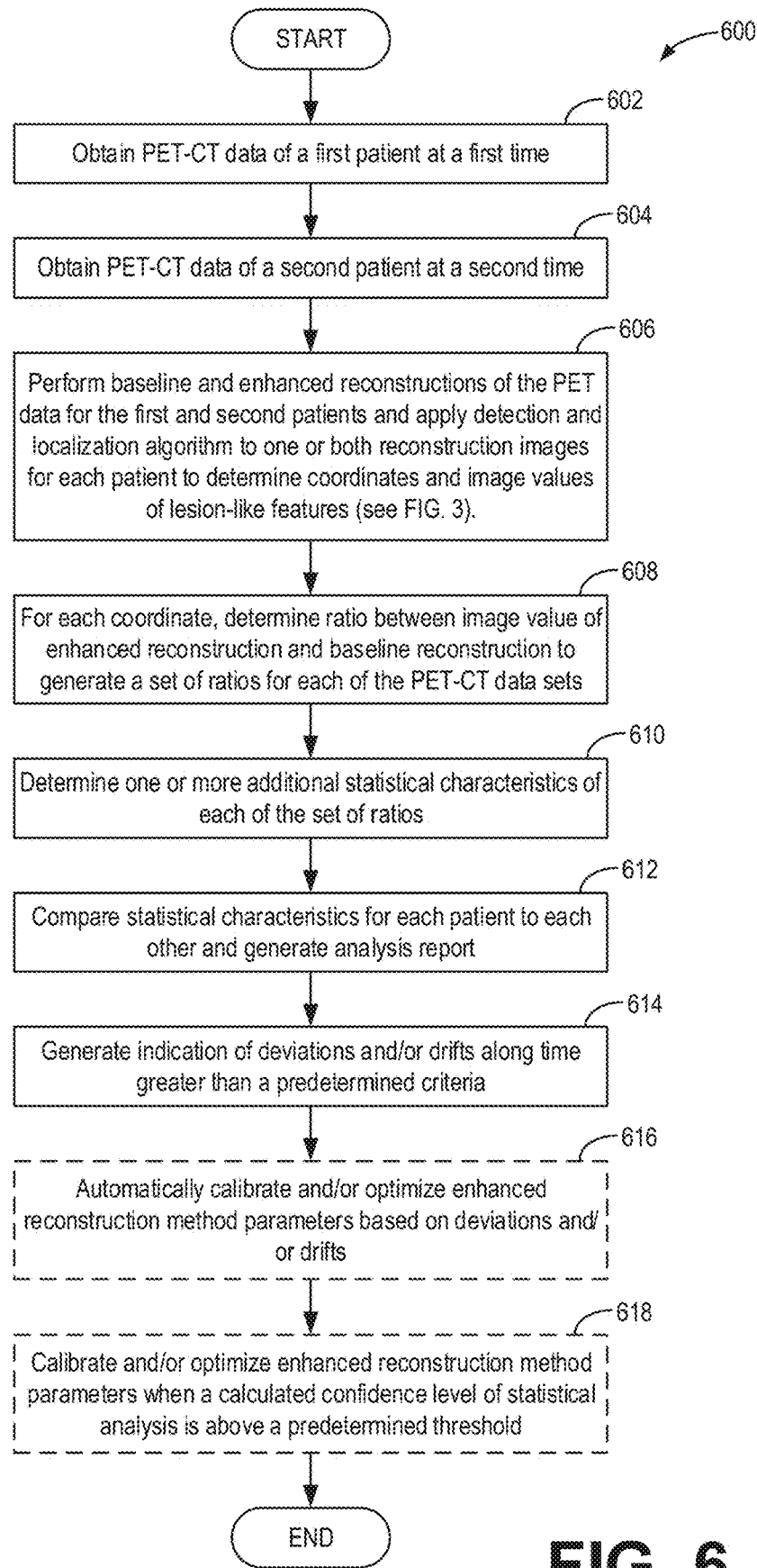
FIG. 6 is a flowchart illustrating an example method for quality control for an imaging reconstruction algorithm along time.

Turning now to FIG. 6, a flowchart illustrating an example method 600 for automatic quality control of an enhanced reconstruction algorithm along time is shown. Method 600 may be carried out using the systems and components described herein above with regard to FIGS. 1-2. For example, the method 600 may be carried out according to instructions stored in memory of one or more controllers, processors, and/or computing devices included as part of and/or communicatively or operatively coupled to an imaging system, such as image reconstruction processor 50 of PET imaging system 12 of multi-modality imaging system 10 described with reference to FIGS. 1-2. Method 600 is described with reference to reconstruction of PET data, though it should be understood that method 600 may be performed for other medical imaging data, as described with reference to FIG. 3.

At 602, method 600 includes obtaining PET-CT data for a first patient at a first time range. PET-CT data may be obtained with an imaging system (e.g., multi-modality imaging system 10 of FIG. 1). The PET-CT data may include CT data acquired by a CT system (e.g., CT imaging system 11) and PET data acquired by a PET system (e.g., PET imaging system 12). In some examples, CT data for the first patient may be reconstructed separately from the PET data.

At 604, method 600 includes obtaining PET-CT data for a second patient at a second, later time range. A time difference between the first and second time range may be an hour, a day, a week, a month, or other suitable time frame. In some examples, one or more scanning profile parameters for the imaging system used to acquire PET-CT data for the first and second patients may be altered in between the first and second times. The PET-CT data for the second patient may be obtained with the same imaging system as the PET-CT data for the first patient. In some examples, CT data for the second patient may be reconstructed separately from the PET data.

At 606, method 600 includes performing baseline and enhanced reconstructions of the PET data for the first patient and the second patient (e.g., a first medical image dataset and a second medical image dataset) and applying a detection and localization algorithm to one or both of the reconstruction images (e.g., the baseline reconstruction image and/or the enhanced reconstruction image) for each patient to determine image values and coordinates of lesion-like features. The baseline reconstructions may be performed by execution of a baseline reconstruction algorithm, such as OSEM, by the image reconstruction processor. The enhanced reconstructions may be performed by execution of an enhanced reconstruction algorithm, such as BSREM, by the image reconstruction processor.

In some examples, the detection and localization algorithm may be applied to each of the baseline reconstruction images and/or the enhanced reconstruction images and executed as described with reference to FIG. 4. Each detected feature of interest (e.g., lesion-like feature) may be localized within a respective volume (e.g., a respective image volume that corresponds to image data for the first or the second patient). Detailed descriptions of the detection and localization method, including detection of image features and determining a coordinate relative to the PET-CT volume for each image feature are provided with respect to method 400 of FIG. 4. Further, an image value may be determined for each image feature. For example, an image value of a local maximum at or around each coordinate may be determined. A set of image values for each of the enhanced reconstruction images and baseline reconstruction images may be generated for each patient. For example, a first set of image values, including a first subset of image values of a first set of features of interest within a first plurality of enhanced images and a second subset of image values of the first set of features of interest within a first plurality of baseline images may be determined. Further, a second set of image values, including a third subset of image values of a second set of features of interest with a second plurality of enhanced images and a fourth subset of image values of the second set of features of interest with a second plurality of baseline images may be determined, wherein the first set of features of interest correspond to the first patient at the first time and the second set of features of interest correspond to the second patient at the second time.

At 608, method 600 includes, for each coordinate, determining a ratio between image values of the baseline reconstruction images and the enhanced reconstruction images for each patient to generate a set of ratios for each of the PET data sets. In some examples, image values for image features of specific coordinates of the baseline reconstruction images may be compared to the image values at the same coordinates of the enhanced reconstruction images. The comparison may result in a ratio between the image values. The ratio may be a non-zero positive number. The set of ratios for each patient may be generated that includes a ratio for each coordinate. In some examples, each ratio may be a ratio of the enhanced image value to the baseline image value such as to define a relative enhancement of the enhanced reconstruction image at a particular coordinate.

At 610, method 600 includes determining one or more additional statistical characteristics of the sets of ratios for each patient. The one or more statistical characteristics may include mean of two of the ratios in the set of ratios, standard deviation of a distribution of the set of ratio values, percentages of data points (e.g., of a ratio) larger than or smaller than the standard deviation which defines outliers, change over time of ratio means and/or standard deviations, difference between two of the ratios and/or difference divided by sum of two of the ratios, and/or the like. Additionally, a statistical confidence level may be calculated for each of the statistical characteristics by way of a technique such as bootstrap analysis. The calculated statistical confidence level may also be used to determine minimal amount of ratios demanded in the set of ratios in order for statistical confidence to be achieved. In some examples, a predetermined confidence level may be defined that may be met in order for results to be considered supported. For example, if too few data points (e.g., ratios) are included in the set, the predetermined confidence level for the one or more statistical characteristics may not be met and therefore results may not be considered supported from a probability standpoint.

As an example, a first plurality of statistical characteristics may be determined for the first set of image values, referenced above, and a second plurality of statistical characteristics may be determined for the second set of image values, also referenced above. The pluralities of statistical characteristics may differ from one another as they are each based on different image datasets (e.g., for different patients).

At 612, method 600 includes comparing the one or more statistical characteristics for the PET data set of each patient to each other and generating an analysis report. In some examples each of the one or more statistical characteristics for each patient may also be compared to predetermined criteria to determine one or more deviations. The statistical characteristics for each PET data set may be compared to each other to determine whether each of the one or more statistical characteristics for the first patient acquired at the first time is statistically different from each corresponding characteristic of the one or more statistical characteristics for the second patient acquired at the second time. Changes over time (e.g., differences in characteristics for the first time compared to the second time) may be drifts, while differences compared to predetermined criteria may be deviations. In some examples, deviations determined for each of the patients may also be compared to each other. Any differences in deviations and/or drifts between the two sets of statistical characteristics may be determined from this comparison. In this way, differences in generated enhanced images as a result of changes to scanning profile over time may be determined.

At 614, method 600 includes generating an indication of determined deviations and/or drifts along time greater than a predetermined threshold. The predetermined threshold may be a deviation and/or drift of a certain degree (e.g., a percentage, a standard deviation, etc.). Any determined deviations and/or drifts may be outputted to the user of the imaging system in order to notify the user that deviations along time have been detected. In this way, the user may be notified that any change to scanning profile parameters may affect enhanced reconstruction and as such the enhanced image reconstruction method may demand modification and/or updating.

At 616, method 600 optionally includes automatically calibrating and/or optimizing enhanced reconstruction algorithm parameters (e.g., modifying the enhanced reconstruction algorithm) based on the deviations and/or drifts determined based on the comparison between the one or more statistical characteristics of the first patient data set and the second patient data set. Calibration and/or optimization of the enhanced reconstruction algorithm parameters may alter the method such that images reconstructed by the method deviate less (e.g., in either positive or negative directions) compared to the predetermined criteria. In some examples, automatically modifying the enhanced reconstruction algorithm based on drifts over time resulting from changes in the scanning profile may account for such changes in the scanning profile and maintain the accuracy of enhanced images generated by the enhanced reconstruction algorithm.

At 618, method 600 optionally includes calibrating and/or optimizing enhanced reconstruction algorithm parameters when a calculated confidence level of statistical analysis is above a predetermined threshold. Similar to as described with reference to FIG. 5, a statistical confidence level may be calculated for each of the one or more statistical characteristics by way of a technique such as bootstrap analysis. The calculated statistical confidence level may also be used to determine minimal amount of ratios demanded in the set of ratios in order for statistical confidence to be achieved. In some examples, a predetermined confidence level may be defined that may be met in order for results to be considered true. This predetermined confidence level may be the predetermined threshold that may be exceeded in order for enhanced reconstruction algorithm parameters to be calibrated and/or optimized. Following 618, the method 600 may end.

Figure 7:
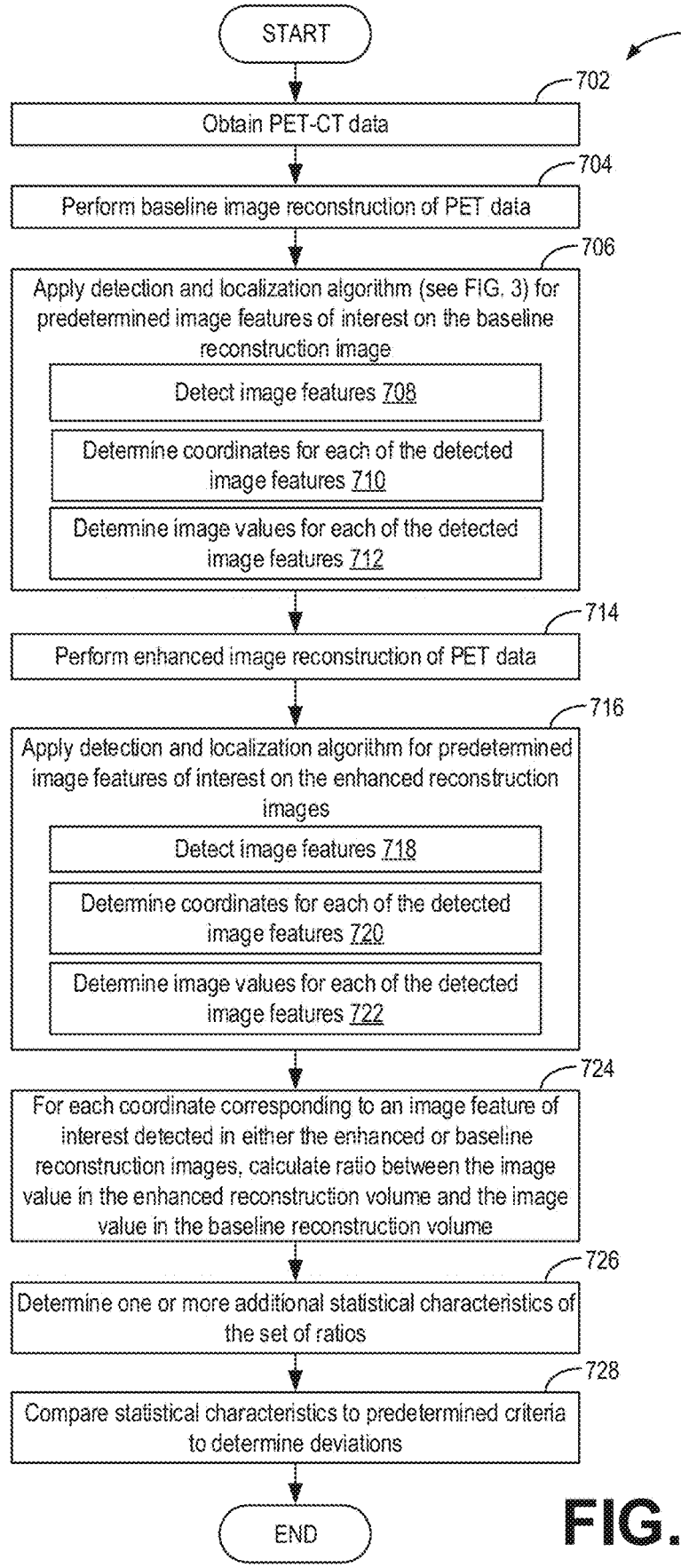
FIG. 7 is a flowchart illustrating another example method for quality control of an enhanced image reconstruction algorithm.

Turning now to FIG. 7, a flowchart illustrating another example method 700 for automatic quality control of enhanced reconstruction algorithms is shown. Method 700 may include detecting image features in both enhanced and baseline reconstruction images in contrast to method 500 which detects image features in only the baseline reconstruction images. Method 700 may be carried out using the systems and components described herein above with regard to FIGS. 1-2. For example, the method 700 may be carried out according to instructions stored in memory of one or more controllers, processors, and/or computing devices included as part of and/or communicatively or operatively coupled to an imaging system, such as image reconstruction processor 50 of PET imaging system 12 of multi-modality imaging system 10 described with reference to FIGS. 1-2. Method 700 is described with reference to reconstruction of PET data, though it should be understood that method 700 may be performed for other medical imaging data, as described with reference to FIG. 3.

At 702, method 700 includes obtaining PET-CT data of a patient or a group of patients. PET-CT data may be obtained with a multi-modality imaging system (e.g., multi-modality imaging system 10 of FIG. 1). The PET-CT data may include CT data acquired by a CT system (e.g., CT imaging system 11) and PET data acquired by a PET system (e.g., PET imaging system 12). In some examples, if PET-CT data is acquired of a group of patients, the same multi-modality imaging system may be used to acquire the PET-CT data for each patient in the group of patients. In some examples, CT data may be reconstructed separately from PET data.

At 704, method 700 includes performing baseline image reconstruction of the PET data. Baseline image reconstruction may be performed by an image reconstruction processor (e.g., image reconstruction processor 50) to generate one or more baseline reconstruction images in the form of an image array, as described with reference to FIG. 2. Baseline image reconstruction may be performed by execution of a baseline reconstruction algorithm, such as OSEM, by the image reconstruction processor.

At 706, method 700 includes applying a detection and localization algorithm for predetermined image features of interest on the baseline reconstruction images. Predetermined image features of interest may be determined based on the type of image data, for example image features of interest for PET data may be areas of increased radiotracer uptake, as previously described. The detection and localization algorithm may include detecting the image features within the one or more baseline reconstructions images, as noted at 708. The detection and localization algorithm may further include determining coordinates for each of the image features detected within the baseline reconstruction images, as noted at 710. Method 700 may further include determining image values for each of the predetermined image features, as noted at 712. Image values may be absolute image values like an SUV or relative image values. In some examples, coordinates may be relative to the PET-CT data volume. The detection and localization algorithm as herein described is described in greater detail with respect to method 400 of FIG. 4.

At 714, method 700 includes performing enhanced image reconstruction of the PET data. Enhanced image reconstruction may be performed by the same image reconstruction processor as used for the baseline image reconstruction to generate one or more enhanced reconstruction images in the form of an image array, as described with reference to FIG. 2. Enhanced image reconstruction may be performed by execution of an enhanced reconstruction algorithm, such as BSREM, by the image reconstruction processor.

At 716, method 700 includes applying the detection and localization algorithm for predetermined image features of interest on the enhanced reconstruction images. The predetermined image features of interest used for the enhanced reconstruction images may be the same as the predetermined image features of interest used for the baseline reconstruction images. As described above, the detection and localization algorithm may include detecting image features within the enhanced reconstruction images, as noted at 718. The algorithm may also include determining coordinates for each of the image features with respect to either the PET-CT volume or real-world coordinates, as noted at 720, and determining image values for each of the image features, as noted at 722. Determining coordinates for each image feature and determining an image value for each image feature may be performed similarly to as described at 710 and 712.

At 724, method 700 includes, for each coordinate corresponding to an image feature detected in either the enhanced reconstruction images or the baseline reconstruction images, calculating a ratio between the image value of the enhanced reconstruction images and the image value of the baseline reconstruction images. A set of ratios may be constructed from each of the determined ratios. In some examples, one or more features of interest may be detected in the enhanced reconstruction images but not in the baseline reconstruction images. Similarly, one or more features of interest may be detected in the baseline reconstruction images but not in the enhanced reconstruction images. In such examples, a coordinate may be determined for an image feature detected in one but not the other of the enhanced and baseline reconstruction images. Image values may then be assigned to the coordinate for both the enhanced and baseline reconstructions, even if the feature of interest was not detected in one of the two. In this way, features of interest that appear on only one of the reconstructed image types may be included in statistical analyses, thereby increasing accuracy of the statistical analyses. Each ratio may define a relative enhancement at its corresponding coordinate, as previously described.

At 726, method 700 includes determining one or more additional statistical characteristics of the set of ratios. The one or more additional statistical characteristics may include mean of two or more of the ratios in the set of ratios (e.g., a mean of all ratios in the set of ratios), mean relative enhancement, standard deviation of a distribution of the set of ratios, percentages of data points (e.g., of a ratio) larger than or smaller than the standard deviation which defines outliers, difference between two of the ratios and/or difference divided by sum of two of the ratios, and/or the like. Additionally, a statistical confidence level may be calculated for each of the statistical characteristics by way of a technique such as bootstrap analysis. The calculated statistical confidence level may also be used to determine minimal amount of ratios demanded in the set of ratios in order for statistical confidence to be achieved. In some examples, a predetermined confidence level may be defined that may be met in order for results to be considered true.

At 728, method 700 includes comparing the one or more statistical characteristics to predetermined criteria to determine deviations. Prior research and/or clinical evaluation may determine a set of criteria for the statistical analyses. The set of criteria may include ranges and/or thresholds, for example a range of mean relative enhancements and a threshold standard deviation. Comparison between the one or more statistical characteristics and the predetermined criteria may determine which of the one or more statistical characteristics are deviations (e.g., a mean ratio outside a range and/or a standard deviation exceeding a threshold value). Enhancement confidence may be determined based on number of deviations or severity of deviation from the predetermined criteria. For example, an enhanced reconstruction image with a mean relative enhancement above an upper end or below a lower end of a range criteria may be determined to have false-positive potential or false-negative potential, respectively. Deviations may be low or high, indicating that the enhanced reconstruction algorithm may be generating images with low enhancement or high enhancement, respectively. Determined deviations may be outputted as an indication to the user to inform the user of potential areas of inaccuracy. A statistical approach such as is described with reference to methods 300, 500, 600, 700 and 800 (discussed below) may allow for more consistency across updates across a wide range of imaging locations because the analysis therein is not tied to a specific type of data or region of the body, allowing for increased use in a variety of clinical settings.

Following 728, results of the comparison may be outputted to a user, saved to memory, and/or may be used to automatically modify the enhanced reconstruction algorithm, as described with reference to methods 300 and 500. Method 700 may then end.

Applying the detection and localization algorithm to both of baseline and enhanced reconstruction images, as opposed to applying the algorithm to only one of the two as described with reference to method 500 of FIG. 5, may increase the accuracy of the quality control, especially if differences between the baseline and enhanced images are relatively large (e.g., if image features are detected in one but not the other). In this way, confidence may be increased for determined deviations and as such, calibration and/or modification to enhanced reconstruction algorithm parameters may be made with greater confidence.

In some examples, multiple enhanced reconstruction algorithms, each with different sets of internal parameters, may be stored within the image reconstruction processor of the multi-modality imaging system. Each of the multiple enhanced reconstruction algorithms, in some examples, may be trained within a computational neural network. Analysis of resultant enhanced reconstruction images generated by reconstruction of medical image data may determine whether a selected algorithm of the multiple enhanced reconstruction algorithms meets or does not meet predetermined criteria. If the selected algorithm does not meet the predetermined criteria, directions of deviations may be used to choose a different algorithm of the multiple enhancement reconstruction algorithms to reconstruct the medical image data. For example, if the selected algorithm generates images with a low mean ratio compared to the predetermined criteria but a standard deviation meets criteria, the different algorithm may be chosen with a sharper-effect enhancement that generates images with a higher mean ratio but maintains the standard deviation.

Figure 8:
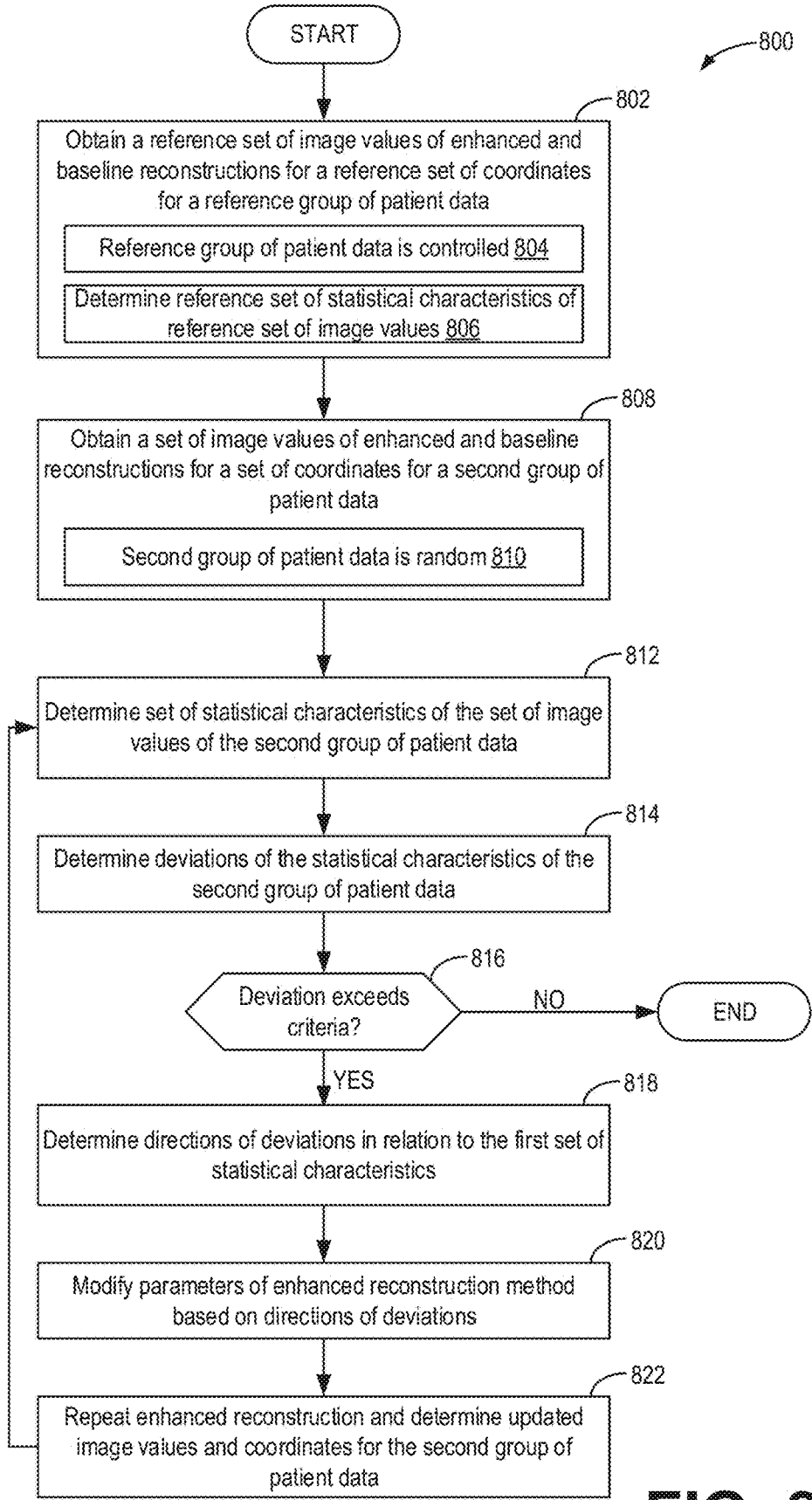
FIG. 8 is a flowchart illustrating an example method for continuous optimization of an enhanced image reconstruction algorithm.

Referring now to FIG. 8, a flowchart illustrating an example method 800 for continuous optimization of an enhanced reconstruction algorithm is shown. Method 800 may be carried out using the systems and components described herein above with regard to FIGS. 1-2. For example, the method 800 may be carried out according to instructions stored in memory of one or more controllers, processors, and/or computing devices included as part of and/or communicatively or operatively coupled to an imaging system, such as image reconstruction processor 50 of PET imaging system 12 of multi-modality imaging system 10 described with reference to FIGS. 1-2. Method 800 is described with reference to reconstruction of PET data, though it should be understood that method 800 may be performed for other medical imaging data, as described with reference to FIG. 3.

At 802, method 800 includes obtaining a reference set of image values (e.g., SUVs) of enhanced and baseline reconstruction images for a reference set of coordinates for a reference group of patient data. The first set of image values may be obtained based on PET-CT data, or other medical imaging data, that is reconstructed by execution of a baseline reconstruction algorithm and an enhanced reconstruction algorithm. A detection and localization algorithm may then be applied to one or both of the resultant reconstruction images in order to detect image features and localize the image features relative to the PET-CT data volume(s) for the reference group of patients. Localization of the image features may include assigning a coordinate for each image feature and generating a coordinate map that includes each of the coordinates.

The reference group of patient data may include data from one or more patients. In some examples, the reference group of patient data is controlled, as noted at 804, wherein image features of interest detected within reconstructed images are known prior to performing statistical analyses. In this way, the reference set of statistical characteristics may be a control group against which arbitrary data may be compared.

At 806, method 800 includes determining a reference set of statistical characteristics of the reference set of image values. The statistical characteristics herein described may include ratios between image values for one or more coordinates of the enhanced reconstruction images and the baseline reconstruction images, a mean ratio, a mean relative enhancement, a standard deviation, and/or more, as described in detail with respect to FIG. 5 which provides detailed descriptions of an example method for obtaining one or more statistical characteristics of comparison between enhanced and baseline reconstructions.

At 808, method 800 includes obtaining a set of image values of enhanced and baseline reconstructions for a set of coordinates for an arbitrary group of patient data. The set of image values may be obtained based on PET-CT data, or other medical imaging data, that is reconstructed by execution of the baseline reconstruction algorithm and the enhanced reconstruction algorithm. The detection and localization algorithm is then applied to one or both of the resultant reconstruction images in order to detect image features and localize the image features relative to the PET-CT data volume for the arbitrary group of patient data. Localization of the image features may include assigning a coordinate for each image feature and generating a coordinate map that includes each of the coordinates.

The arbitrary group of patient data may include data from one or more patients. The arbitrary group of patient data is random, as noted at 810, wherein image features of interest detected within reconstructed images are not predetermined prior to obtaining the statistical characteristics. In this way, a set of statistical characteristics for the arbitrary group of patient data may be compared to the reference set of statistical characteristics, which is controlled as noted.

At 812, method 800 includes determining the set of statistical characteristics of the set of image values of the arbitrary group of patient data. The set of statistical characteristics may be determined by statistical analyses of the set of image values. The set of statistical characteristics may include ratios between image values for coordinates in the coordinate map, a mean ratio, a mean relative enhancement, a standard deviation of distribution, and/or the like. The one or more statistical characteristics determined by the statistical analyses may be the same type of characteristics as determined for the reference group of patient data.

At 814, method 800 includes determining deviations of the set of statistical characteristics of the arbitrary group of patient data. The set of statistical characteristics may be compared to predetermined criteria. The predetermined criteria, in some examples, may be a range or a threshold for each of the statistical characteristics (e.g., a range of mean ratios, a range of mean relative enhancements, a standard deviation threshold, etc.). Each of the characteristics in the set of characteristics may be compared to a corresponding predetermined criteria. Characteristics in the set of statistical characteristics that lie outside of a corresponding range or above a corresponding threshold may be considered deviations with respect to the predetermined criteria.

At 816, method 800 judges whether a deviation exceeds criteria (e.g., is above or below ends of a range or exceeds a threshold). If the deviation exceeds the criteria (YES), method 800 proceeds to 818. If the deviation does not exceed the criteria (NO), method 800 ends. If the deviation does not exceed the criteria, no modifications to the enhanced reconstruction algorithm parameters may be indicated and the method may end.

At 818, method 800 includes determining direction of deviations of the set of statistical characteristics of the arbitrary group of patient data in relation to the reference set of statistical characteristics. In some examples, a direction may be positive or negative. As an example, a positively directed deviation may be a characteristic value above (e.g., greater than) a corresponding characteristic value in the reference set of statistical characteristics and a negatively directed deviation may be a characteristic value below (e.g., less than) a corresponding characteristic value in the reference set of statistical characteristics. For example, a deviant mean ratio of 1.8 in the set of statistical characteristics of the arbitrary group of patient data may be considered positively deviated with respect to a non-deviant mean ratio of 1.35 in the reference set of statistical characteristics of the reference group of patient data.

At 820, method 800 includes modifying parameters of the enhanced reconstruction algorithm based on the determined directions of the deviations. Modification of the parameters may result in the enhanced reconstruction algorithm generating images differently than prior to modification. Parameters of the enhanced reconstruction algorithm may affect enhancement strength, including sharpening filters, regularization weights such as BSREM β-values, selection of a pre-trained deep-learning model from a group of models, and the like. In some examples, modification of parameters may occur automatically upon detection of deviation(s) exceeding criteria. In other examples, an indication may be displayed to the user via a display device (e.g., display 96 or operator workstation 46 of FIG. 2) informing the user of the detected deviation(s) and/or recommendation for modification of the enhanced reconstruction algorithm. In such examples, user input may trigger modification of the enhanced reconstruction algorithm.

At 822, method 800 includes repeating enhanced reconstruction of the PET-CT data of the arbitrary group of patient data and determining an updated set of image values and coordinates for the arbitrary group of patient data. Detection of image features and localization of the image features (e.g., assigning coordinates) may be determined by the detection and localization algorithm, as previously described. Image values at each of the coordinates may then be determined. Images resultant from the repeated enhanced reconstruction may differ from the original enhanced reconstruction images, and as a result the updated set of image values for image features at specified coordinates may differ from the original set of image values because the repeated enhanced reconstruction was performed with different parameters than the original enhanced reconstruction. In some examples, the set of coordinates for the repeated enhanced reconstruction images of the arbitrary group of patient data may differ from the set of coordinates for the original enhanced reconstruction images of the arbitrary group of patient data.

An updated set of statistical characteristics for the arbitrary group of patient data may be determined from the updated set of image values and coordinates, including ratios between image values of the repeated enhanced reconstruction images and the baseline reconstruction images, a mean ratio, a mean relative enhancement, standard deviation of distribution, etc. The updated set of statistical characteristics may differ from the original set of statistical characteristics because of the modifications made to the enhanced reconstruction algorithm. Analysis of the updated set of characteristics may also be repeated, including determining deviations, whether those deviations exceed criteria, and direction of deviations relative to the reference set of statistical characteristics.

Method 800 may continuously (e.g., iteratively) modify the enhanced reconstruction algorithm by repeating enhanced reconstruction, determination of sets of image values, and statistical analyses as herein described until the method 800 judges at 816 that no deviations exceed criteria. In this way, continuous modification may fine tune the enhanced reconstruction algorithm until the algorithm generates enhanced reconstruction images matching or otherwise having characteristics within the predetermined criteria, thereby increasing accuracy of image reconstruction and increasing clinical use of enhanced reconstruction images.

Following 820, method 800 may return to 810 to compare statistical characteristics of the first group of patient data (e.g., the first set of statistical characteristics) to the statistical characteristics of the second group of patient data (e.g., the third set of statistical characteristics). In this way, iterative and/or continuous modification of the enhanced reconstruction algorithm may be performed based on deviations compared to a reference (e.g., a control) group of data.

In some examples, the original enhanced reconstruction algorithm may be locally stored and executed by processors of imaging systems at multiple medical/imaging facilities. A first facility may reconstruct first image data using the original enhanced reconstruction algorithm on a first imaging system, compute statistical analyses as described with reference to one or more of method 300, 500, 600, 700, and 800, and modify the original enhanced reconstruction algorithm to generate a first updated enhanced reconstruction algorithm. A second facility may reconstruct second image data using the original enhanced reconstruction algorithm on a second imaging system, compute statistical analyses as described with reference to one or more of method 300, 500, 600, 700, and 800, and modify the original enhanced reconstruction algorithm to generate a second updated enhanced reconstruction algorithm. The first update of the enhanced reconstruction algorithm may not be performed on the second imaging system, and the second update of the enhanced reconstruction algorithm may not be performed on the first imaging system. In this way, each medical facility may have different updates of the enhanced reconstruction algorithm specific to their respective imaging systems. In some examples, the first updated enhanced reconstruction algorithm may be different from the second updated enhanced reconstruction algorithm and each may be locally stored to respective memories. In this way, generalized updates to the enhanced reconstruction algorithm may be avoided as, in some instances, a generalized update may not be suitable for the enhanced reconstruction algorithm specific to a particular imaging system. Thus, individualized updates may be completed, reducing possibility of erroneous updates to the algorithm that could potentially result in inaccurate image reconstruction. Further, the statistical approach for updating the enhanced reconstruction algorithm may provide for more consistent modifications to the algorithm, as identification of deviations compared to the baseline reconstruction algorithm is not tied to a specific type of data or region of the body. Thus, while individualized updates may be completed and stored at different medical facilities, resultant enhanced reconstruction images may be more consistent across a wide range of medical facilities (given that predefined criteria are similar).

Referring now to FIG. 9, a block illustration of filter kernels is shown. The filter kernels herein described may be convolved with an image volume, such as a PET image volume, during a detection and localization algorithm, such as the detection and localization method described with reference to FIG. 4.

A first kernel 902 may be configured to detect blobs of a first size. The first kernel 902 may comprise a first smaller inner cube 906 and a first larger surrounding cube 904. The first smaller inner cube 906 may have a multiplication weight of +1 and the first larger surrounding cube 904 may have a multiplication weight of −1. A volume of the first larger surrounding cube 904 may include a volume that surrounds the first smaller inner cube 906, excluding a volume of the first smaller inner cube 906. As described with reference to FIG. 4, the first kernel 902 may be scanned along the image volume, using the multiplication weights of the first smaller inner cube 906 and the first larger surrounding cube 904 to multiply with image values of the image volume, to generate a first volumetric map.

A second kernel 908 may be configured to detect blobs of a second size. The second size may be larger than the first size. The second kernel 908 may comprise a second smaller inner cube 912 and a second larger surrounding cube 910. The second smaller inner cube 912 may have a volume larger than the first smaller inner cube 906 of the first kernel 902 and the second larger surrounding cube 910 may have a volume larger than the first larger surrounding cube 904 of the first kernel 902. The second smaller inner cube 912 may have a multiplication weight of +1 and the second larger surrounding cube 910 may have a multiplication weight of −1. The volume of the second larger surrounding cube 910 may include a volume that surrounds the second smaller inner cube 912, excluding the volume of the second smaller inner cube 912. Similar to the first kernel 902, the second kernel 908 may be scanned along the image volume, using the multiplication weights of the second smaller inner cube 912 and the second larger surrounding cube 910 to multiply with image values of the image volume, to generate a second volumetric map.

A third kernel 914 may be configured to detect blobs of a third size. The third size may be larger than the first size and the second size. The third kernel 914 may comprise a third smaller inner cube 918 and a third larger surrounding cube 916. The third smaller inner cube 918 may have a volume larger than the first smaller inner cube 906 of the first kernel 902 and the second smaller inner cube 912 of the second kernel 908 and the third larger surrounding cube 916 may have a volume larger than the first larger surrounding cube 904 of the first kernel 902 and the second larger surrounding cube 910 of the second kernel 908. The third smaller inner cube 918 may have a multiplication weight of +1 and the third larger surrounding cube 916 may have a multiplication weight of −1. The volume of the third larger surrounding cube 916 may include a volume that surrounds the third smaller inner cube 918, excluding the volume of the third smaller inner cube 918. Similar to the first kernel 902 and the second kernel 908, the third kernel 914 may be scanned along the image volume, using the multiplication weights of the third smaller inner cube 918 and the third larger surrounding cube 916 to multiply with image values of the image volume, to generate a third volumetric map.

In some examples, each of the first, second, and third volumetric maps may be combined with a predetermined weighting to generate a volumetric spatial weight map. FIG. 10 depicts an illustrated example of a volumetric spatial weight map 1002. The volumetric spatial weight map 1002 as shown is generated from combination of three different volumetric maps configured to detect blobs of three different sizes, though combinations of other amounts of volumetric maps is possible. A first blob 1004 may be resultant from a first filter configured to detect blobs of a first size. A second blob 1006 that surrounds the first blob 1004 may be resultant from a second filter configured to detect blobs of a second size larger than the first size. A third blob 1008 may be resultant from a third filter configured to detect blobs of a third size larger than the second and first sizes. The combination of the first blob 1004, the second blob 1006, and the third blob 1008 may be a first feature of interest 1014. Multiple features of interest may be included in the volumetric spatial weight map 1002, each constructed of one or more blobs detected by one or more filter kernels.

As described with reference to FIG. 4, a local non-maximum suppression process may be applied to each feature of interest in order to localize the local maxima points on the volumetric spatial weight map 1002. A resultant coordinate map 1010 may be generated localizing each of the local maxima relative to the image volume. For example, a first local maximum 1012 that corresponds to the first feature of interest 1014 may have a coordinate in three dimensions (e.g., an x-coordinate, a y-coordinate, and a z-coordinate) that localizes the first local maximum 1012 within the image volume. Each feature of interest may have a corresponding local maximum with a defined coordinate included in the coordinate map 1010. In some examples, an image value calculated for a feature of interest may be determined based on uptake at and/or around a coordinate of the feature of interest.

Turning now to FIG. 11, an example of a medical image 1100 reconstructed by one of a baseline and enhanced reconstruction algorithm is shown. Medical image 1100 may be projected as a two dimensional projected rendering (e.g., an uptake-value grayscale MIP), as shown in FIG. 11. A first view 1102 of the two dimensional projected rendering includes one or more features of interest 1104. The features of interest 1104 may be reconstructed as blobs within the medical image 1100. The features of interest 1104 may also be projected in a second view 1110 of the two dimensional projected rendering. In some examples, the first view 1102 may be a coronal projection while the second view 1110 may be a sagittal projection, though other views are possible. Each of the features of interest 1104 may be localized in three dimensional space relative to a volume of the medical image 1100, though they are shown in two dimensions in FIG. 11.

As described with reference to FIGS. 4 and 10, each feature of interest may be localized with a coordinate and a local maximum at and/or around the coordinate. A coordinate map 1106 of all coordinates for the medical image 1100 may be overlaid on each of the first and second views 1102, 1110, as well as other additional views if included. Each coordinate point in the coordinate map may be tracked in both the first and second views 1102, 1110 given that each coordinate point is localized in three dimensions. For example, each of one or more coordinate points 1108 may correspond to one of the features of interest 1104. The coordinate points 1108 may be displayed in both the first view 1102 and the second view 1110.

Turning now to FIG. 12, an example of a medical image 1200 is shown. Medical image 1200 may be reconstructed by a baseline reconstruction algorithm, generating at least one baseline reconstruction image 1202. Medical image 1200 may also be reconstructed by an enhanced reconstruction algorithm, generating at least one enhanced reconstruction image 1206. The baseline reconstruction image 1202 and the enhanced reconstruction image 1206 are shown in FIG. 12 as two dimensional projected renderings. The baseline reconstruction algorithm may be an MLEM such as OSEM and the enhanced reconstruction algorithm may be a BSREM or AI-enhanced method, as previously discussed.

Each of the baseline reconstruction image 1202 and the enhanced reconstruction image 1206 may include features of interest. For example, a first feature of interest 1210 may be included in the baseline reconstruction image 1202. A second feature of interest 1214 may be included in the enhanced reconstruction image 1206. In some examples, the first feature of interest 1210 may be the same feature of interest as the second feature of interest 1214.

A coordinate point 1212 may be determined for the first feature of interest 1210. The coordinate point 1212 may be part of a coordinate map 1208. The coordinate map 1208 may include multiple coordinate points corresponding to features of interest of the baseline reconstruction image 1202. The coordinate point 1212 may be defined in three dimensions. Because the baseline reconstruction image 1202 from which the coordinate map 1208 is generated and the enhanced reconstruction image 1206 are both reconstructed from the same medical image 1200, the coordinate map 1208 may be transposed or copied from the baseline reconstruction image 1202 onto the enhanced reconstruction image 1206. The coordinate point 1212 may then overlay onto the enhanced reconstruction image 1206. In some examples, the coordinate point 1212 may overlay onto a feature of interest, such as second feature of interest 1214.

As described with reference to FIG. 5, image values at the coordinate point 1212 within both the baseline reconstruction image 1202 and the enhanced reconstruction image 1206 may be compared to each other to determine a ratio and, in some examples, additional statistical characteristics. Modifications to the enhanced reconstruction algorithm may be made based on analysis of the ratios and/or the additional statistical characteristics.

FIG. 13 shows an example of a statistical analysis of such ratios in a graph 1300. The graph 1300 shows baseline image values (e.g., SUVs) on the abscissa and an enhanced image values (e.g., SUVs) on the ordinate, wherein each data point of a plurality of data points 1302 is a ratio between a baseline image value and an enhanced image value. The graph shows a distribution of data points. A data point where the baseline image value is equal to the enhanced image value may have a ratio of 1. A data point where the baseline image value is greater than the enhanced image value may have a ratio between 0-1. A data point where the baseline image value is less than the enhanced image value may have a ratio greater than 1. Each ratio may define a relative enhancement provided by the enhanced reconstruction algorithm compared to the baseline reconstruction algorithm. For example, a ratio of 1.4 may define a relative enhancement of 40% while a ratio of 0.8 may define a relative enhancement of −20%.

A first line 1304 may define a slope of 1, where each point along the first line 1304 has a ratio of 1. The first line 1304 may have a relative enhancement of 0%. One or more second lines 1306 may also be included in the graph 1300 noting slopes/ratios greater than or less than 1. Each of the one or more second lines 1306 may have a relative enhancement greater than or less than 0%, for example, −20%, 20%, and/or 40%. The one or more data points 1302 may be distributed about the graph 1300 with reference to the first line 1304 and the one or more second lines 1306. Data points, for example data points 1308 and/or data point 1310, may lie outside of a predetermined criterion (e.g., a predetermined range) and may be considered outliers. In some examples, the graph 1300 may include a mean ratio line (not shown) that indicates the mean value (e.g., mean ratio) for the plurality of data points 1302. Based on the distribution of data points and individual data points, statistical analyses may determine one or more statistical characteristics of the plurality of data points 1302 included in the graph 1300.

The one or more additional statistical characteristics may be determined based on the ratios (e.g., data points) included in the graph 1300. The additional statistical characteristics may include mean of two or more of the ratios in the set of ratios, a mean relative enhancement, standard deviation of a distribution of the set of ratio values, percentages of data points (e.g., of a ratio) larger than or smaller than the standard deviation which defines outliers, change over time of ratio means and/or standard deviations, difference between two of the ratios and/or difference divided by sum of two of the ratios, and/or the like. Additionally, a statistical confidence level may be calculated for each of the statistical characteristics by way of a technique such as bootstrap analysis, as previously described with reference to FIGS. 5 and 7. As described previously, each of the statistical characteristics may be compared to predetermined criteria to determine whether each of the statistical characteristics deviates from the predetermined criteria.

A technical effect of the methods and systems described herein is that image reconstruction techniques may be optimized. Specifically, modification and updating of an enhanced reconstruction algorithm may be performed automatically or a suggestion for modification may be outputted to a display device for interaction by a user. Modifications to the enhanced reconstruction algorithm may reduce false-positive uptake enhancement while maintaining reduced overall image noise, as may be seen with a baseline reconstruction algorithm. In some examples, modifications to the enhanced reconstruction algorithm may be performed continuously (e.g., iteratively) until an amount of enhancement generated by the enhanced reconstruction algorithm is within a predefined criteria. Continuous modification in this way may reduce computer processing demands of the imaging system or connected computing device(s), which in turn increases speed of output of reconstructed images to a user.

Further, the modifications and resultant updated enhanced construction algorithm may be specific to a particular imaging system, whereby updates made to the algorithm may be based on deviations and/or drifts in image value ratios and statistical characteristics of a set of ratios as compared along time. For example, a first set of statistical characteristics for image data acquired at a first time by an imaging system may be compared to a second set of statistical characteristics for image data acquired at a second time by the imaging system.

Any change in scan parameters of the imaging system (e.g., scan time, administered dose of radiotracer, type of radiotracer, etc.) may be accounted for in the modification made to the enhanced reconstruction algorithm. A statistical approach as disclosed herein may allow for increased consistency of updates across a wide range of imaging locations as the updates are not tied to a specific type of data or region of the body. As such, different updates to the enhanced reconstruction algorithm, for example at different medical facilities, may result in similar levels of enhancement when compared to the baseline reconstruction algorithm.

Automatic quality control via automatic modification of enhanced reconstruction algorithms as herein described may reduce false-positive and false-negative findings, thereby improving workflow and user satisfaction. Additionally, computer processing demands may be reduced by reducing need for repeat acquisition and/or reconstruction of data as a result of inaccurate image reconstruction. Further, inaccurate images stored in memory may be reduced, thereby saving memory storage space.

The disclosure also provides support for a method, comprising: determining first image values of a first set of features of interest within one or more baseline reconstruction images reconstructed by a baseline reconstruction algorithm, determining second image values of a second set of features of interest within one or more enhanced reconstruction images reconstructed by an enhanced reconstruction algorithm, wherein the second set of features of interest are co-localized with the first set of features of interest relative to an image volume, comparing the first image values to the second image values to determine one or more statistical characteristics of the one or more enhanced reconstruction images, automatically modifying one or more parameters of the enhanced reconstruction algorithm based on the one or more statistical characteristics, wherein the enhanced reconstruction algorithm was used to generate the one or more enhanced reconstruction images, and storing the enhanced reconstruction algorithm with the modified one or more parameters in memory. In a first example of the method, the one or more baseline reconstruction images are reconstructed from the same medical image data as the one or more enhanced reconstruction images. In a second example of the method, optionally including the first example: the one or more baseline reconstruction images comprise a first set of baseline reconstruction images reconstructed from first medical image data obtained over a first time range and a second set of baseline reconstruction images reconstructed from second medical image data obtained over a second, later time range, the one or more enhanced reconstruction images comprise a first set of enhanced reconstruction images reconstructed from the first medical image data and a second set of enhanced reconstruction images reconstructed from the second medical image data, comparing the first image values to the second image values to determine one or more statistical characteristics of the one or more enhanced reconstruction images comprises comparing first image values of the first set of baseline reconstruction images to first image values of the first set of enhanced reconstruction images to determine a first set of statistical characteristics and comparing second image values of the second set of baseline reconstruction images to second image values of the second set of enhanced reconstruction images to determine a second set of statistical characteristics, modifying the one or more parameters is based on the second set of statistical characteristics relative to the first set of statistical characteristics. In a third example of the method, optionally including one or both of the first and second examples, determining the first image values of the first set of features of interest within the one or more baseline reconstruction images and determining the second image values of the second set of features of interest within the one or more enhanced reconstruction images comprises identifying at least a portion of the first set of features of interest within the one or more baseline reconstruction images and mapping at least the portion of the first set of features of interest to the image volume and identifying at least a portion of the second set of features of interest as coordinates that match coordinates of at least the portion of the first set of features of interest in the image volume. In a fourth example of the method, optionally including one or more or each of the first through third examples, the method further comprises: identifying remaining features of the second set of features of interest within the one or more enhanced reconstruction images, mapping the remaining features to the image volume, and identifying remaining features of the first set of features as coordinates that match coordinates of the remaining features of the second set of features of the image volume. In a fifth example of the method, optionally including one or more or each of the first through fourth examples, the first image values and the second image values are standard uptake values (SUVs) determined based on tissue radioactivity concentration in relation to whole body concentration of total injected dose of radiotracer. In a sixth example of the method, optionally including one or more or each of the first through fifth examples, the one or more statistical characteristics comprise a set of ratios, a mean ratio, a standard deviation, and a mean relative enhancement, wherein the set of ratios includes ratios for each coordinate, each ratio being between a first image value of the first set of features of interest for a specified coordinate and a second image value of the second set of features of interest for the specified coordinate. In a seventh example of the method, optionally including one or more or each of the first through sixth examples, the method further comprises: comparing the one or more statistical characteristics to predetermined criteria to determine deviations and automatically modifying the one or more parameters of the enhanced reconstruction algorithm based on the determined deviations. In a eighth example of the method, optionally including one or more or each of the first through seventh examples, the one or more parameters of the enhanced reconstruction algorithm comprise any of enhancement strength, sharpening filter, regularization weight, and selection of a pre-trained deep-learning model. In a ninth example of the method, optionally including one or more or each of the first through eighth examples, the enhanced reconstruction algorithm with the modified one or more parameters is used to reconstruct subsequent diagnostic images that are outputted for display. In a tenth example of the method, optionally including one or more or each of the first through ninth examples, the baseline reconstruction algorithm is a maximum likelihood expectation maximization (MLEM) algorithm and the enhanced reconstruction algorithm is a block sequential regularized expectation maximization (BSREM) algorithm. In a eleventh example of the method, optionally including one or more or each of the first through tenth examples, the medical image data is one of positron emission tomography (PET) data, magnetic resonance imaging (MRI) data, computerized tomography (CT) data, ultrasound data, and single photon emission computed tomography (SPECT) data.

The disclosure also provides support for a system for automatic quality control of enhanced reconstruction algorithms, comprising: a computing device communicatively coupled to an imaging system configured to generate positron emission tomography (PET) image data, the computing device configured with instructions in non-transitory memory that when executed cause the computing device to: obtain a first image dataset of a first patient at a first time, obtain a second image dataset of a second patient at a second time, reconstruct the first image dataset with a baseline reconstruction algorithm to generate one or more first baseline images and an enhanced reconstruction algorithm to generate one or more first enhanced images, reconstruct the second image dataset with the baseline reconstruction algorithm to generate one or more second baseline images and the enhanced reconstruction algorithm to generate one or more second enhanced images, detect a first plurality of lesion-like features within the one or more first baseline images and a second plurality of lesion-like features within the one or more second baseline images, localize each of the detected lesion-like features of the first and second pluralities of lesion-like features within a respective volume of image data and assign a coordinate to each of the detected lesion-like features, determine a baseline image value and an enhanced image value for each of the assigned coordinates, determine a first set of ratios and a second set of ratios, the first set of ratios comprising ratios between corresponding baseline image values and enhanced image values of the first plurality of lesion-like features and the second set of ratios comprising ratios between corresponding baseline image values and enhanced image values of the second plurality of lesion-like features, determine a first plurality of statistical characteristics for the first set of ratios and a second plurality of statistical characteristics for the second set of ratios, determine one or more deviations between the first plurality of statistical characteristics and the second plurality of statistical characteristics, wherein a deviation is a difference between corresponding characteristics greater than a predetermined criterion, and modify one or more parameters of the enhanced reconstruction algorithm based on the one or more deviations to generate an updated enhanced reconstruction algorithm. In a first example of the system, the first plurality of statistical characteristics and the second plurality of statistical characteristics each comprise at least one of a mean ratio, a standard deviation, and a mean relative enhancement. In a second example of the system, optionally including the first example, parameters of the imaging system differ between the first time and the second time, the parameters including at least one of scan time, administered dose of radiotracer, and type of radiotracer.

The disclosure also provides support for a method, comprising: obtaining a first set of statistical characteristics of a first set of image values, wherein the first set of image values comprises a first subset of image values of a first set of features of interest within a first plurality of enhanced images reconstructed by an enhanced reconstruction algorithm and a second subset of image values of the first set of features of interest within a first plurality of baseline images reconstructed by a baseline reconstruction algorithm, performing a first update of the enhanced reconstruction algorithm based on the first set of statistical characteristics, obtaining a second set of statistical characteristics of a second set of image values, wherein the second set of image values comprises a third subset of image values of a second set of features of interest within a second plurality of enhanced images reconstructed by the enhanced reconstruction algorithm and a fourth subset of image values of the second set of features of interest within a second plurality of baseline images reconstructed by the baseline reconstruction algorithm, performing a second update of the enhanced reconstruction algorithm based on the second set of statistical characteristics, wherein the second update is different from the first update. In a first example of the method, each of the first and second subsets of image values of the first set of features of interest and each of the third and fourth subsets of image values of the second set of features of interest comprises a baseline image value and an enhanced image value corresponding to a specified feature of interest, the baseline image value determined from a respective plurality of baseline images and the enhanced image value determined from a respective plurality of enhanced images. In a second example of the method, optionally including the first example, the method further comprises: comparing the first set of statistical characteristics to predetermined criteria to determine a first set of deviations and comparing the second set of statistical characteristics to the predetermined criteria to determine a second set of deviations, the second set of deviations different from the first set of deviations. In a third example of the method, optionally including one or both of the first and second examples, the first update of the enhanced reconstruction algorithm is based on the first set of deviations determined of the first set of statistical characteristics and the second update of the enhanced reconstruction algorithm is based on the second set of deviations determined of the second set of statistical characteristics. In a fourth example of the method, optionally including one or more or each of the first through third examples, the first and second subsets of image values are determined for a first medical image dataset and the third and fourth subsets of image values are determined for a second medical image dataset, different from the first medical image dataset, wherein the first medical image dataset is acquired by a first imaging system and the second medical image dataset is acquired by a second imaging system, wherein the first update of the enhanced reconstruction algorithm is performed on the first imaging system and not on the second imaging system, and wherein the second update of the enhanced reconstruction algorithm is performed on the second imaging system and not on the first imaging system.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
    determining first image values of a first set of features of interest within one or more baseline reconstruction images reconstructed by a baseline reconstruction algorithm;
    determining second image values of a second set of features of interest within one or more enhanced reconstruction images reconstructed by an enhanced reconstruction algorithm, wherein the second set of features of interest are co-localized with the first set of features of interest relative to an image volume;
    comparing the first image values to the second image values to determine one or more statistical characteristics of the one or more enhanced reconstruction images;
    automatically modifying one or more parameters of the enhanced reconstruction algorithm based on the one or more statistical characteristics, wherein the enhanced reconstruction algorithm was used to generate the one or more enhanced reconstruction images; and
    storing the enhanced reconstruction algorithm with the modified one or more parameters in memory.

2. The method of claim 1, wherein the one or more baseline reconstruction images are reconstructed from the same medical image data as the one or more enhanced reconstruction images.

3. The method of claim 1, wherein:
    the one or more baseline reconstruction images comprise a first set of baseline reconstruction images reconstructed from first medical image data obtained over a first time range and a second set of baseline reconstruction images reconstructed from second medical image data obtained over a second, later time range;
    the one or more enhanced reconstruction images comprise a first set of enhanced reconstruction images reconstructed from the first medical image data and a second set of enhanced reconstruction images reconstructed from the second medical image data;
    comparing the first image values to the second image values to determine one or more statistical characteristics of the one or more enhanced reconstruction images comprises comparing first image values of the first set of baseline reconstruction images to first image values of the first set of enhanced reconstruction images to determine a first set of statistical characteristics and comparing second image values of the second set of baseline reconstruction images to second image values of the second set of enhanced reconstruction images to determine a second set of statistical characteristics;
    modifying the one or more parameters is based on the second set of statistical characteristics relative to the first set of statistical characteristics.

4. The method of claim 1, wherein determining the first image values of the first set of features of interest within the one or more baseline reconstruction images and determining the second image values of the second set of features of interest within the one or more enhanced reconstruction images comprises identifying at least a portion of the first set of features of interest within the one or more baseline reconstruction images and mapping at least the portion of the first set of features of interest to the image volume and identifying at least a portion of the second set of features of interest as coordinates that match coordinates of at least the portion of the first set of features of interest in the image volume.

5. The method of claim 1, further comprising identifying remaining features of the second set of features of interest within the one or more enhanced reconstruction images, mapping the remaining features to the image volume, and identifying remaining features of the first set of features as coordinates that match coordinates of the remaining features of the second set of features of the image volume.

6. The method of claim 1, wherein the first image values and the second image values are standard uptake values (SUVs) determined based on tissue radioactivity concentration in relation to whole body concentration of total injected dose of radiotracer.

7. The method of claim 1, wherein the one or more statistical characteristics comprise a set of ratios, a mean ratio, a standard deviation, and a mean relative enhancement, wherein the set of ratios includes ratios for each coordinate, each ratio being between a first image value of the first set of features of interest for a specified coordinate and a second image value of the second set of features of interest for the specified coordinate.

8. The method of claim 1, further comprising comparing the one or more statistical characteristics to predetermined criteria to determine deviations and automatically modifying the one or more parameters of the enhanced reconstruction algorithm based on the determined deviations.

9. The method of claim 1, wherein the one or more parameters of the enhanced reconstruction algorithm comprise any of enhancement strength, sharpening filter, regularization weight, and selection of a pre-trained deep-learning model.

10. The method of claim 1, wherein the enhanced reconstruction algorithm with the modified one or more parameters is used to reconstruct subsequent diagnostic images that are outputted for display.

11. The method of claim 1, wherein the baseline reconstruction algorithm is a maximum likelihood expectation maximization (MLEM) algorithm and the enhanced reconstruction algorithm is a block sequential regularized expectation maximization (BSREM) algorithm.

12. The method of claim 2, wherein the medical image data is one of positron emission tomography (PET) data, magnetic resonance imaging (MRI) data, computerized tomography (CT) data, ultrasound data, and single photon emission computed tomography (SPECT) data.

* * * * *